United States Patent [19]

Leib

[11] Patent Number: 4,735,486

[45] Date of Patent: Apr. 5, 1988

[54] SYSTEMS AND METHODS FOR PROCESSING OPTICAL CORRELATOR MEMORY DEVICES

[75] Inventor: Kenneth G. Leib, Wantagh, N.Y.

[73] Assignee: Grumman Aerospace Corporation, Bethpage, N.Y.

[21] Appl. No.: 718,088

[22] Filed: Mar. 29, 1985

[51] Int. Cl.[4] .......................... G02B 27/46; G02B 5/32; G03H 1/16

[52] U.S. Cl. ............................. 350/162.13; 350/3.7; 350/3.82

[58] Field of Search .................... 350/162.13, 3.7, 3.6, 350/3.82

[56] References Cited

U.S. PATENT DOCUMENTS

| | | | |
|---|---|---|---|
| 3,226,057 | 12/1965 | Wilson . | |
| 3,398,269 | 8/1968 | Williams . | |
| 3,485,269 | 12/1969 | De Mario . | |
| 3,492,469 | 1/1970 | Silverman . | |
| 3,622,794 | 11/1969 | Pond et al. . | |
| 3,630,593 | 12/1971 | Bartek et al. . | |
| 3,638,006 | 1/1972 | Hogan . | |
| 3,674,332 | 7/1972 | Kogelnik . | |
| 3,675,983 | 7/1972 | LaMacchia . | |
| 3,754,808 | 8/1973 | Clay et al. | 350/3.86 |
| 3,756,683 | 9/1973 | Smith, Jr. . | |
| 3,779,492 | 12/1973 | Grumet . | |
| 3,794,272 | 2/1974 | Hecker . | |
| 4,250,465 | 2/1981 | Leib . | |
| 4,317,610 | 3/1982 | Breglia et al. . | |
| 4,349,907 | 9/1982 | Campillo et al. . | |
| 4,447,111 | 5/1984 | Leib | 350/3.7 |

OTHER PUBLICATIONS

Almeida, S. P., et al, "Multispectral Size-Averaged Incoherent Spatial Filtering," *Applied Optics*, vol. 18, No. 23, Dec. 1, 1979, pp. 4025–4029.

"Real-Time-Screen-Aided Multiple-Image Optical Holographic Matched-Filter Correlator" by H. K. Liu and J. Graeme Duthie, Applied Optics, vol. 21, No. 18, Sep. 15, 1982.

"Height Contouring by Wavelength Multiplexing" by H. Bartelt, Optics Communication, vol. 49, No. 1, Feb., 1984.

A Variable Wavelength Laser Line Scanner, Report RM-794, May 1984, by Kenneth G. Leib & Philip Grieve.

*Primary Examiner*—John K. Corbin
*Assistant Examiner*—David J. Edmondson
*Attorney, Agent, or Firm*—Scully, Scott, Murphy & Presser

[57] ABSTRACT

An optical correlator memory processing system. By operating the system within preselected maximum and minium wavelengths, by preselecting certain parameters of the system, and by operating the system within certain additional constraints, the system can be used to always cause interference between the Fourier transform of a spatially modulated signal beam and a reference beam at a recording medium at a multitude of wavelengths. This allows a matched filter to be fabricated and played back at these multitudes of wavelengths without changing the sensitivity of the system. The system may be used to fabricate matched filters, and as a correlation system to detect the presence or absence of a particular target in a selected view or scene.

30 Claims, 8 Drawing Sheets

$F_0$ = 207.4 mm $\theta_0$ = 7.7°

$\mu$ = 1.2958

SYSTEMS AND METHODS FOR PROCESSING OPTICAL CORRELATOR MEMORY DEVICES

BACKGROUND OF THE INVENTION

This invention generally relates to systems and methods for constructing and using holographic elements, and more particularly to systems and methods for recording optical matched filters and using those filters at a multitude of wavelengths.

In the construction of holographic optical elements, a first construction beam is projected such that it is incident upon a recording medium. As is well known, the recording medium can be a photographic emulsion, dichromated gelatin, a photopolymer, and the like, and can be coated or mounted on a suitable substrate such as a glass plate, thin film, and the like. Simultaneously, and from the same source of coherent electromagnetic radiation, which preferably is a laser, a second construction beam is directed at an angle so that it is incident upon the recording medium such that it overlaps the first construction beam at the medium. The result of the overlapping input beams on the recording medium is an optical interference pattern which is recorded in the medium as an amplitude or phase distribution of closely spaced lines. If the first input beam is normal to the plane of the recording medium, the spacing, b, between lines formed in the lens is determined by the equation:

$$b=\lambda/\sin\theta \tag{1}$$

where λ is the wavelength of the construction beams, and θ is the angle between the plane of the recording medium and the second construction beam.

In use, should a holographic lens be illuminated with a collimated beam of radiation, an off-axis focus will be achieved. If the beam remains collimated but the wavelength is changed, a second off-axis focus having a different offset angle and focal distance than the first is obtained. This result is the consequence of the fact that physically a hologram is basically a highly complex diffraction grating. The angle, θ, and focal length, F, of a collimated beam of light having wavelength λ that is dispersed by a holographic lens are given by the equations:

$$\sin\theta=m\,\lambda/b \tag{2}$$

and $$F=(\lambda c/\lambda\, F_c \tag{3}$$

where $\lambda_c$ and $F_c$ are the wavelength and focal length of the beam used to construct the hologram, and b is the spacing of the line array formed in the holograph. λ and F are referred to as the playback wavelength and focal length respectively.

Thus, the relationship between the dispersion angles, $\theta_o$ and $\theta_1$, of the collimated light beams of two different wavelengths, $\lambda_o$ and $\lambda_1$, dispersed by a holographic lens is given by the equation:

$$\frac{\sin\theta_0}{\sin\theta_1}=\frac{m\lambda_0/b}{m\lambda_1/b}=\frac{\lambda_0}{\lambda_1} \tag{4}$$

and the relationship between the focal distances, $F_o$ and $F_1$, of those two light beams is given by the equation:

$$\frac{F_0}{F_1}=\frac{(\lambda_c/\lambda_0)F_c}{(\lambda_c/\lambda_1)F_c}=\frac{\lambda_1}{\lambda_0} \tag{5}$$

Matched filters are one type of holographic element that are used in optical correlator systems to detect the presence of a selected target in a scene or a field of view. To construct a matched filter, one of the collimated construction beams, referred to as the signal beam, is spatially modulated by passing it through an image of the selected target. The two construction beams then combine at the matched filter plane to produce a diffractionn pattern unique to the selected target. When a matched filter is used in an optical correlator system, a collimated light beam is passed through a selected view and then transmitted to the matched filter. The output of the matched filter is a light beam directed to an inverse transform lens. If the selected target is not present in the view, the output of the matched filter is relatively weak and diffused, and that output remains diffused as it passes through the inverse transform lens. However, if the suspected target is present in the submitted view, the light traversing the matched filter becomes collimated, and the inverse transform lens brings the output beam from the matched filter to a focus.

A light sensitive detector is located at the focal point of the inverse transform lens, and when light is focused on that detector, an output signal is produced. This output signal is used to trigger some type of device, depending upon the apparatus in which the target recognition system is used. Such a device might be a simple alarm or a complex guidance system, for example.

It is often advantageous to fabricate a matched filter at one wavelength and to use the filter at a second wavelength. For example, some images are recorded best in a matched filter at a wavelength in the blue light spectra and played back best at a wavelength in the red light spectra. In addition, in some situations, when a matched filter is operated at the same wavelength at which it was fabricated, the operating light signal has a tendency to alter the image formed in the matched filter. This tendency is substantially reduced if the matched filter is operated at a wavelength different from the wavelength used to fabricate the filter.

Heretofore, individual optical systems have not been designed to manufacture or operate matched filters readily at multiple wavelengths. Systems having this flexibility would have particular advantages in remote locations such as on satellites where it is difficult, if not practically impossible, to reposition the various elements of an optical system in any significant way to operate the system at different wavelengths. Such a system would also have significant utility in a laboratory or similar setting, since it would eliminate the need, and the time required, to alter the system substantially to operate matched filters at multiple wavelengths.

SUMMARY OF THE INVENTION

An object of the invention is to record and use matched filters in an optical memory at different wavelengths.

Another object of the present invention is to provide an optical system that can automatically adjust to cause spatial interference between the Fourier transform of a spatially modulated, collimated coherent light beam and a reference beam from the same source, at different wavelengths of the source beam.

A further object of this invention is to fabricate a matched filter memory at a first wavelength and to use the filter at a second wavelength without changing the characteristics of the filter.

In accordance with this invention, a monochromatic collimated source light beam having a controllable wavelength is directed to a first optical element that splits the source beam into signal and reference beams. Pursuant to a first embodiment of this invention, this first optical element is a beam splitter. A first output beam from the beam splitter is used as the signal beam and is directed through an image to spatially modulate the signal beam. The signal beam is then directed to a second optical element such as a holographic lens, and the first order output beam thereof is focused on a medium used to record a matched filter. A second output beam from the beam splitter is used as the reference beam and is reflected off a mirror to a third optical element, for example a diffraction grating, which directs the reference beam to the recording medium for the matched filter.

In accordance with a second embodiment of the invention, a transmitting optical diffraction grating is used as the first optical element and a reflecting mirror is used as the third optical element. The zero order output beam from the grating is used as the signal beam and is directed through an image, which spatially modulates the beam, to the second optical element, and then onto the recording medium for the matched filter. The first order output beam from the diffraction grating is used as the reference beam and is reflected off the mirror, which reflects this beam onto the matched filter recording medium.

With both embodiments of the invention, the reference and signal beams interfere at the recording medium for the matched filter, producing a matched filter or Fourier transform hologram thereon. By selecting certain optional parameters of the systems and operating the systems within certain constraints, the systems can be operated to always cause interference between the Fourier transform of the signal beam and the reference beam at the matched filter recording medium at a multitude of source beam wavelengths.

A system embodying this invention may utilize a multiplicity of radiation sources, each of a discrete wavelength and having its output directed at a dispersion element, and where the sources are selectively activated to vary the wavelength of the source beam. Alternately, a single radiation source, with the wavelength of that single source varied, preferably by means such as a parametric converter, may be employed in this invention.

The radiation source used in the invention can be of any suitable type such as a laser which may be of the liquid, solid, or gaseous type having either a discrete or continuous output. As will be understood by those skilled in the art, the laser must have a power output sufficient to meet the requirements placed thereon. If a crystal-type parametric converter is employed, it is also necessary that the laser have an operational wavelength which is suitably close to the degenerate frequency of the crystal used.

It will also be appreciated that, although the radiation may be in the visible range of the electromagnetic spectrum, other wavelengths may be more desirable in some cases and can be employed. Likewise, it is recognized that a laser is a preferred source of radiation, thus, the radiation source will be referred to as a "laser" and its output as a laser beam. It will be apparent, of course, that this choice of terminology is not to be construed to impose a limitation on the scope of this invention.

Preferably, energy from the zero order output beam from the second optical element is passed to a fourth optical element which diffracts, refracts, or otherwise deflects that beam in synchronism with the wavelength of the radiation. This deflected beam is tracked by radiation sensors and information derived therefrom is used for system control functions.

This fourth optical element may be a prism interposed in the path of the zero order output beam from the second dispersion element. If the wavelength of the source beam is changed, the deflection angle of the beam output of the fourth dispersion element also changes. An array of photosensitive devices, such as photodiodes or photocells, is positioned in the path of the output beam from the prism, and the output signal from individual photosensitive devices that are activated when the prism output beam impinge on them is an indication of the wavelength of the source beam. This output of the photosensitive devices is used to control movement of the medium on which the matched filter is recorded to different positions depending on the wavelength of the source beam.

Further benefits and advantages of the invention will become apparent from a consideration of the following description given with reference to the accompanying drawings which specify and show preferred embodiments of the invention.

DETAILED DESCRIPTION OF THE PREFERRED EMBODIMENTS

Figure 1:
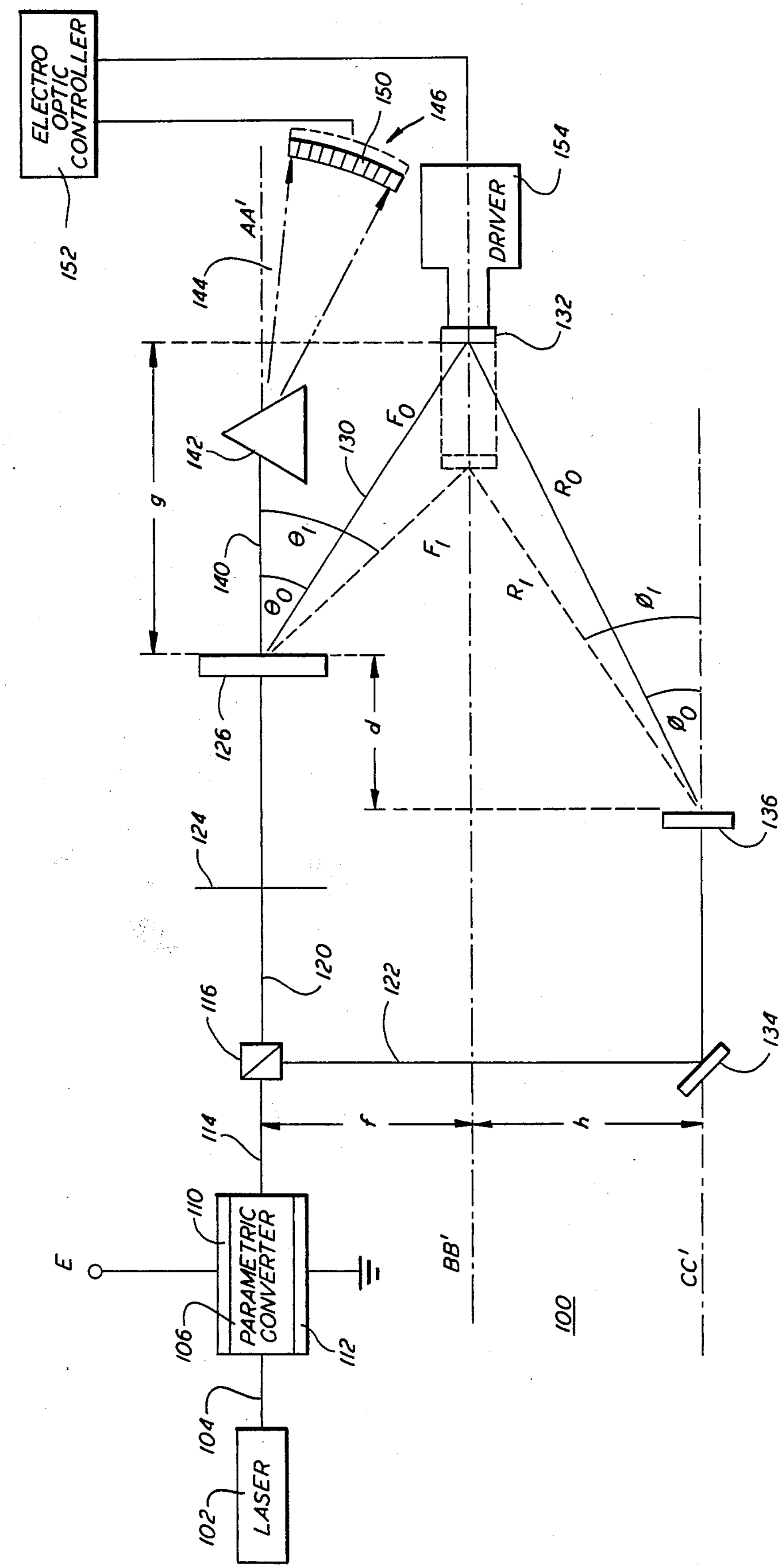
FIG. 1 is a functional block diagram of one embodiment of an optical correlator memory fabrication system in accordance with this invention.

With reference now to the drawings, FIG. 1 illustrates a first optical system 100 of this invention. A source of monochromatic collimated light energy of substantially fixed wavelength such as a laser 102 produces an output beam 104 which is directed into a parametric converter or interactor 106. Laser 102 preferably is of the gaseous type such as an argon ion laser producing a continuous output at a wavelength near 5,000 angstroms, but suitable lasers of other types such as a yttrium aluminum garnet (YAG) continuous wave laser or a carbon dioxide laser can also be employed. It will be understood, of course, irrespective of the type of radiation source employed, it is essential that it have a sufficiently high level of output power.

Parametric converters are devices in which a variation of one or more forces such as the electric field, stress, or the temperature thereof is imposed upon an anisotropic (birefringent) crystalline material, and that variation is used to convert an incident electromagnetic input at one wavelength, and frequency, into an output having a different wavelength, and frequency. A description of a representative example in which the principle is utilized in optical parametric oscillators and modulators is disclosed in U.S. Pat. No. 3,328,723. Inasmuch as these devices are well known, in the interests of brevity and clarity, a detailed description thereof will not be given.

Attached to surfaces of parametric converer 106 in a suitable manner as by a plating technique are electrodes 110 and 112. The electrodes are connected to a source of electric potential such that an electric field can be applied to the crystalline material of parametric converter 106. It is a well-known property of parametric converters that if a beam is directed through it, the wavelength of the emerging beam varies with the electric field intensity E between the electrodes of the converter according to the expression:

$$\lambda_E = \lambda_o + \Delta\lambda = \lambda_o + f_1(E) \tag{6}$$

where $\lambda_o$ is the wavelength of the emerging beam when E is zero, $\Delta\lambda$ is the change in wavelength from $\lambda_o$, and $f_1$ (E) is a function of the applied electric field intensity defining $\Delta\lambda$.

For a lithium niobate crystal, it has been found that $\Delta\lambda$ varies with the square root of E and that an electric field of 100 volts/centimeter will develop a wavelength shift of about 22 nanometers.

The energy beam 114 exiting from interactor 106 is directed to a first optical element which is, preferably, a beam splitter 116 that splits beam 114 into first and second output beams 120 and 122. The first output beam 120 from splitter 116 is referred to as the signal beam and is directed through an image 124 which spatially modulates the beam. This modulated signal beam is then directed to a second optical element, which preferably is a holographic lens 126, and the first order output beam 130 of the holographic lens is directed to a medium 132 used to record a matched filter. The second output beam 122 from splitter 116 is referred to as the reference beam and is directed by mirror 134 to a third optical element, which is a diffraction grating 136. Grating 136 deflects reference beam 122 onto recording medium 132 so as to interfere with the signal beam and produce a recordable diffraction pattern on that medium.

In accordance with the present invention, by operating system 100 with a wavelength between preselected maximum and minimum wavelengths, $\lambda_o$ and $\lambda_1$, by selecting certain parameters of the system, and by operating that system within certain other related constraints, the system can be used to always cause interference between the Fourier transform of the signal beam and the reference beam at recording medium 132 at a multitude of wavelengths between $\lambda_o$ and $\lambda_1$. This allows a matched filter to be fabricated on medium 132 at these multitude of wavelengths between those two limiting wavelengths.

Consider first two vectors $\overline{F}_o$ and $\overline{F}_1$ which represent the focal distances and the dispersion angles shown in FIG. 1 of collimated light beams of the two different wavelengths $\lambda_o$ and $\lambda_1$ dispersed by holographic lens 126.

$$\overline{F_o} - \overline{F_1} = \overline{X} \tag{7}$$

Expressing $F_o$ and $F_1$ in terms of $\hat{i}$ and $\hat{j}$ values, $$\overline{X} = (x_o\hat{i} + y_o\hat{j}) - (x_1\hat{i} + y_1\hat{j}) \tag{8}$$

$$\overline{X} = (x_o - x_1)\hat{i} + (y_o - y_1)\hat{j} \tag{9}$$

Using the angles shown in FIG. 1, it can be readily derived also that:

$$\overline{X} = (F_o \cos\theta_0 - F_1 \cos\theta_1)\hat{i} + (F_o \sin\theta_o - F_1 \sin\theta_1)\hat{j} \tag{10}$$

Combining equations (4) and (5) from the previous discussion concerning the construction of holographic elements, which of course applies to holographic lens 126, shows that $$F_o/F_1 = \lambda_1/\lambda_o = \sin\theta_1/\sin\theta_0 \tag{11}$$

Rearranging this equation demonstrates that $$F_o \sin\theta_o = F_1 \sin\theta_1 \tag{12}$$

Thus, the components of $\hat{j}$ in equation (10) cancel each other out so that $$\overline{X} = (F_o \cos\theta_o - F_1 \cos\theta_1)\hat{i} \tag{13}$$

This shows that the focal point of the Fourier transform of the image dispersed through holographic lens 126 moves along an axis parallel to the axis AA′ of the source beam. Thus, the first constraint on system 100 is that medium 132 move along an axis BB′ parallel to the axis AA′ and to the axis of the reference beam between mirror 134 and grating 136, referred to as the reference axis CC′.

The distance, x, the focal point moves along the BB′ axis is given by the equation:

$$x = F_o \cos\theta_o - F_1 \cos\theta_1 \tag{14}$$

From the basic trigonometric principal $$\sin^2\theta_1 + \cos^2\theta_1 = 1 \tag{15}$$

it can be derived that $$\cos\theta_1 = \sqrt{1 - \sin^2\theta_1} \quad (16)$$

Substituting the right hand side of equation (16) for cos $\theta_1$ in equation (14) shows that $$x = F_o\cos\theta_o - F_1\sqrt{1 - \sin^2\theta_1} \quad (17)$$

From equation (4) it is seen that $$\sin\theta_1 = (\lambda_1/\lambda_o)\sin\theta_o \quad (18)$$

and from equation (5) it is seen that $$F_1 = (\lambda_o/\lambda_1)F_o \quad (19)$$

Substituting the right hand sides of equations (18) and (19) for sin $\theta_1$ and $F_1$ respectively in equation (17) shows that $$x = F_o\cos 0_o - F_o\frac{\lambda_o}{\lambda_1}\sqrt{1 - \frac{\lambda_1^2}{\lambda_o^2}\sin^2\theta_o} \quad (20)$$

and this equation simplifies to $$x = F_o\cos\theta_o - F_o\sqrt{\frac{\lambda_o^2}{\lambda_1^2} - \sin^2\theta_o} \quad (21)$$

Generalizing equation (21) to express x in terms of any particular wavelength $\lambda_i$ between $\lambda_o$ and $\lambda_1$ yields the expression $$x = F_o\cos\theta_o - F_o\sqrt{\frac{\lambda_o^2}{\lambda_i^2} - \sin^2\theta_o} \quad (22)$$

Thus, the second constraint on system 100 is that, as the wavelength of source beam 114 changes from $\lambda_o$ to $\lambda_i$, medium 132 moves along axis BB' in accordance with equation (22).

The initial lateral displacement, f, of medium 132 from axis AA' is given simply by the equation:

$$f = F_o\sin\theta_o \quad (23)$$

The initial longitudinal displacement, g, of medium 132 from holographic lens 126 is given by the equation $$g = F_o\cos\theta_o \quad (24)$$

The remaining parameters that must be set for system 100 are the lateral displacement, h, between axis BB' and the reference axis CC', and the longitudinal displacement, d, between the dispersion surfaces of elements 126 and 136.

From FIG. 1 it is apparent that the longitudinal displacement between the dispersion surface of the third optical element 136 and the recording surface of medium 132 is the same regardless of whether that distance is expressed in terms of the horizontal components of $R_o$ or $R_1$ or in terms of d plus the horizontal components of $F_o$ or $F_1$. This fact can be mathematically expressed as follows:

$$R_o\cos\phi_o = F_o\cos\theta_o + d \quad (25)$$

and $$R_1\cos\phi_1 = F_1\cos\theta_1 + d \quad (26)$$

FIG. 1 also shows that $$h = R_o\sin\phi_o = R_1\sin\theta_1 \quad (27)$$

Equation (27) can be rearranged to show that $$R_o = h/\sin\phi_o \quad (28)$$

and $$R_1 = h/\sin\phi_1 \quad (29)$$

Substituting the right hand side of equation (28) for $R_o$ in equation (25) shows that $$(h/\sin\phi_o)\cos\phi_o = F_o\cos\theta_o + d \quad (30)$$

which simplifies to $$h\cot\phi_o = F_o\cos\theta_o + d \quad (31)$$

Equation (31) can be rearranged to isolate h as follows $$h = F_o\cos\theta_o\tan\phi_o + d\tan\phi_o \quad (32)$$

Now substituting the right hand side of equation (29) for $R_1$ in equation (26) shows that $$(h/\sin\phi_1)\cos\phi_1 = F_1\cos\theta_1 + d \quad (33)$$

which simplifies to $$h\cot\phi_1 = F_1\cos\theta_1 + d \quad (34)$$

Equation (34) can be rearranged to isolate h as follows:

$$h = F_1\cos\theta_1\tan\phi_1 + d\tan\phi_1 \quad (35)$$

To express d independent of h, the left and right hand sides of equation (35) can be subtracted respectively from the left and right hand sides of equation (32), yielding $$h - h = F_o\cos\theta_o\tan\phi_o + d\tan\phi_o - (F_1\cos\theta_1\tan\phi_1 + d\tan\phi_1) \quad (36)$$

This simplifies to $$0 = F_o\cos\theta_o\tan\phi_o + d\tan\phi_o - F_1\cos\theta_1\tan\phi_1 - d\tan\phi_1 \quad (37)$$

and this further simplifies to $$d\tan\phi_1 - d\tan\phi_o = F_o\cos\theta_o\tan\phi_o - F_1\cos\theta_1\tan\phi_1 \quad (38)$$

Solving for d yields $$d = \frac{F_0\cos\theta_0\tan\phi_0 - F_1\cos\theta_1\tan\phi_1}{\tan\phi_1 - \tan\phi_0} \quad (39)$$

To express h independent of d, the left and right hand sides of equation (34) are subtracted respectively from the left and right sides of equation (31), producing $$h \cot \phi_o - h \cot \phi_1 = F_o \cos \theta_o + d - (F_1 \cos \theta_1 + d) \tag{40}$$

This simplifies to $$h(\cot \phi_o - \cot \phi_1) = F_o \cos \theta_o - F_1 \cos \theta_1 \tag{41}$$

Solving for h yields $$h = \frac{F_0 \cos\theta_0 - F_1 \cos\theta_1}{\cot\phi_0 - \cot\phi_1} \tag{42}$$

Thus, initial given values for the maximum and minimum source beam wavelengths, $\lambda_o$ and $\lambda_1$, maximum and minimum focal lengths $F_o$ and $F_1$, minimum and maximum signal beam deflection angles $\theta_o$ and $\theta_1$, and minimum and maximum reference beam angle $\phi_o$ and $\phi_1$, determine the initial parameters h, d, f and g that establish the initial placement of medium 132. For any subsequent source beam wavelength, the distance x can be determined and medium 132 moved accordingly to generate the conditions for fabricating a matched filter on medium 132 at that different wavelength. It should be noted that, regardless of the wavelength used to construct the matched filter, the filter always has the same system constant, S, given by the equation $$S = 1/\lambda_F \tag{43}$$

Although the various means may be utilized to move medium 132 to the appropriate location in accordance with the source beam wavelength, a preferred embodiment employs an automatic control arrangement such as that illustrated in FIG. 1. In this arrangement, the zero order output beam 140 from holographic lens 126 is directed at a fourth optical element which, as shown in FIG. 1, may be a refractive prism 142. As is well known, a prism diffracts an incident beam in accordance with the wavelength thereof, as does a diffraction grating. Therefore, the angle of deflection of output beam 144 from prism 142 can be monitored to determine the wavelength of source beam 114. As will be understood by those skilled in the art, a simple holographic grating made by interfering two plane waves and recording the interference pattern can be used to replace prism 142. Output beam 144 from prism 142 is directed against an array 146 of radiation sensors 150 that are positioned equidistant from the apparent point of deflection of the prism refracted beam 144. The number of sensors 150 per unit of length is determined by the incremental width of movement desired for medium 132. It will be appreciated that, the greater the number of sensors 150 per unit of length, the finer the control available.

In operation, when the wavelength of the radiation incident on dispersion element 142 is varied, output beam 144 is deflected and illuminates a sensor 150 and a signal is generated by the illuminated sensor. The generated signal is conducted to electro-optic controller 152 which, in turn, generates a control signal. This control signal is conducted to driver 154 for medium 132 which positions that recording medium in accordance with the wavelength of source beam 114.

Various specific elements or circuits may be used as electro-optic controller 152 and likewise numerous particular devices may be used as driver 154, and suitable such elements and devices may be readily constructed by those of ordinary skill in the art. For instance, driver 154 may be a mechanical, piezo-electric, or magneto-electrically operated device. A thorough explanation of the details of electro-optic controller 152 and matched filter driver 154 are not essential to the practice of the present invention, and thus those details are not shown in the drawings. The signal generated by sensor array 146 may also be used to control the voltage applied to parametric converter 106 and, thus, the wavelength of source beam 114. One such control arrangement for varying the wavelength of source beam 114 in response to the signal output from sensor array 146 is explained in detail in U.S. Pat. No. 4,250,465.

Figure 2:
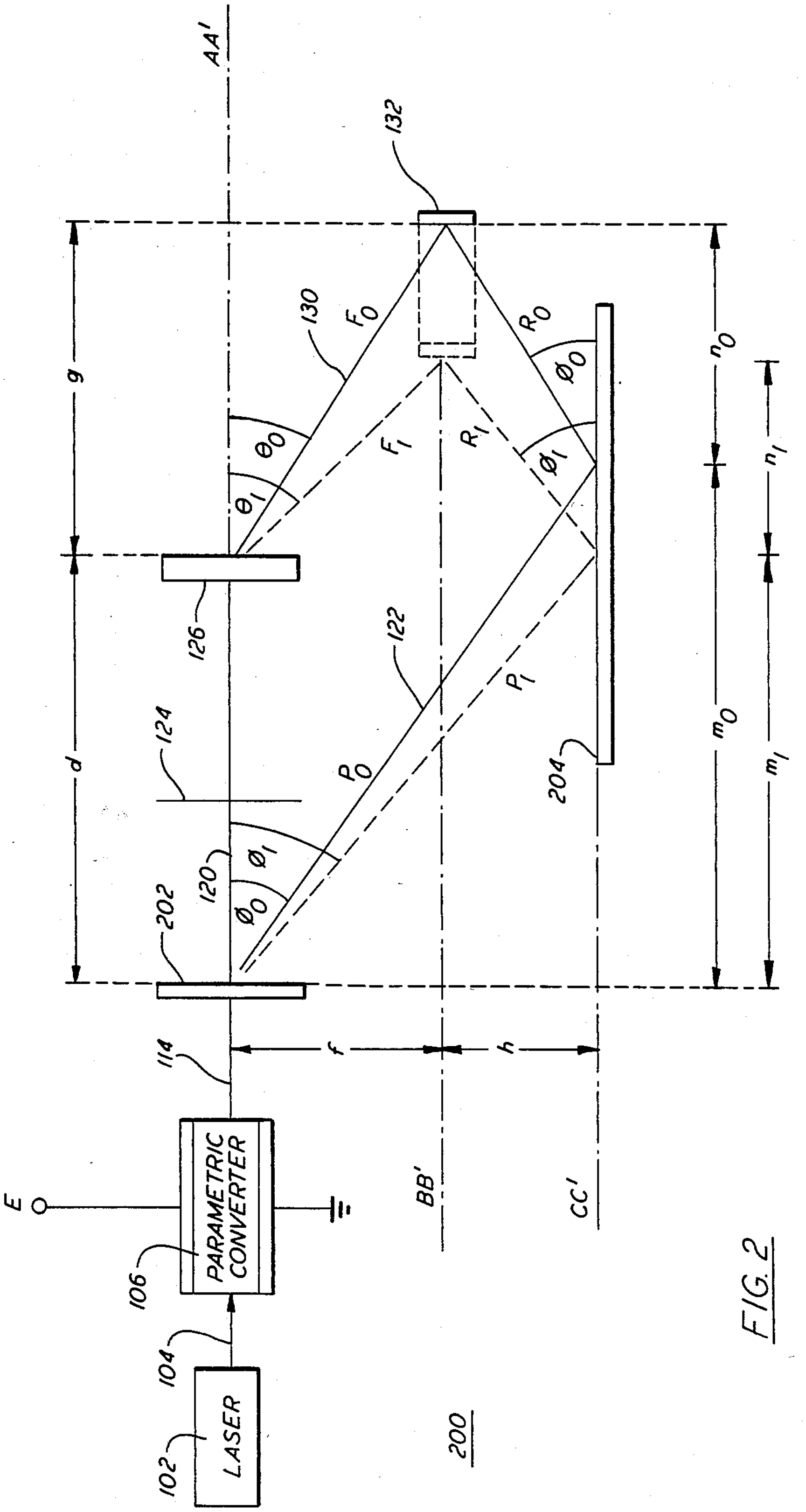
FIG. 2 is a functional block diagram of a second optical correlator memory fabrication system in accordance with the present invention.

FIG. 2 illustrates portions of system 200 in accordance with a second embodiment of this invention. System 200 is very similar to system 100, and identical elements of the two systems are given identical reference numerals in the drawings. The principal differences between the systems 100 and 200 are that the first optical element of system 200 comprises a transmitting optical diffraction grating 202, and the third optical element of system 200 comprises mirror 204. The other elements of system 200 that are shown in FIG. 2, parametric converter 106, second optical element 126, and the recording medium 132 for the matched filter are the same as used in system 100. Further, system 200 may also include the matched filter drive and drive control of FIG. 1. These components of system 200 are not shown in FIG. 2 for the sake of clarity.

In operation, output beam 114 of parametric converter 106 is passed through diffraction grating 202. It is well-known that a diffraction grating will diffract an incident energy beam into a plurality of beams of zero, first, second, etc., orders according to the expression:

$$\sin \theta_i \pm \sin \theta_d = m\lambda/b \tag{44}$$

where

- $\theta_i$ is the incident angle of the input beam measured from the normal to the grating,
- $\theta_d$ is the deflection angle measured from the normal to the grating,
- m is the order, 0, 1, 2, etc.,
- $\lambda$ is the wavelength of the energy beam,
- b is the spacing of the grating lines, and
- the sign depends on whether the incident beam and the deflected beam are on the same side of the grating normal or not.

For simplicity, it is assumed that the incident beam is normal to the grating so that $\theta_i = 0$ and $\sin \theta_d = m\lambda/b$. It will be seen then that the zero order output beam of grating 202 is undeviated, that is, it is also normal to the grating, the first order output beam is diffracted by a particular angle, and the second order beam (not shown) is diffracted by an even greater angle. Higher order beams will be deflected more than the first order beam and may be employed in system 200 if a greater deflection is found to be desirable. Generally, however, the energy of the first order beam is greater than in the higher order beams and thus the first order beam is preferred. It is known also that the rulings of a diffraction grating can be so shaped as to enhance the efficiency of a selected order. In addition, it should be noted that for each order there will exist on the opposite side of the zero angle beam another beam having the same angle of diffraction but of an opposite sign; however, in the interest of clarity, that second beam or the beams of higher orders are not illustrated on the drawings. In the description to follow, the angle of deflection of the output beam of diffraction grating 202 and other associated quantities will relate to those of the first order beam unless otherwise specified.

The zero order output beam from grating 202 is used as signal beam 120 in system 200 and is passed through image 124 to holographic lens 126, and output beam 130 is therefrom directed onto recording medium 132 at a focal distance $F_o$ and at an angle $\theta_o$ to the normal of the plane of that recording medium. The first order output beam from grating 202 is used as reference beam 122 in system 200 and is applied to mirror 204. Mirror 204 has a plane reflecting surface parallel to the axis of beam 120 between dispersion elements 202 and 126 and reflects reference beam 122 so as to impinge at an appropriate angle $\phi_o$ upon matched filter recording medium 132.

As with system 100, by operating system 200 with a wavelength between preselected maximum and minimum values $\lambda_o$ and $\lambda_1$, by selecting certain parameters of the system, and by operating the system within certain other related constraints, the system can be employed to always cause interference between the Fourier transform of signal beam 120 and the reference beam 122 at recording medium 132 at a multitude of wavelengths of source beam 114. For the same reasons discussed above in connection with system 100, the first constraint is that medium 132 move along the axis BB' parallel to the signal beam axis AA' and to the axis of mirror 204, referred to as the reference axis CC'; and the second constraint is that, as the wavelength of source beam 114 changes from $\lambda_o$ to $\lambda_i$, recording medium 132 moves along axis BB' a distance x in accordance with the equation $$x = F_o\cos\theta_o - F_o\sqrt{\frac{\lambda_o^2}{\lambda_i^2} - \sin^2\theta_o} \quad (45)$$

The initial displacement, f, of medium 132 from axis AA' is given by the equation $$f=F_o \sin \theta_o \quad (46)$$

The initial displacement, g, of medium 132 from holographic lens 126 is given by the equation $$g=F_o \cos \theta_o \quad (47)$$

The remaining parameters of system 200 are the initial longitudinal displacement, d, between the dispersion surfaces of first and second optical elements 202 and 126, and the lateral displacement, h, between the axis BB' and the reference axis CC'. These parameters are determined as follows:

First, with reference to FIG. 2, the longitudinal displacement between the dispersion surface of first optical element 202 and the recording surface of medium 132 is the same regardless of whether that distance is expressed in terms of $m_o$, $m_1$, $n_o$ or $n_1$, or in terms of d plus the horizontal components of $F_o$ or $F_1$. This fact can be expressed as follows:

$$m_o+n_o=d+F_o \cos \theta_o \quad \text{and} \quad (48)$$

$$m_1+n_1=d+F_1 \cos \theta_1 \quad (49)$$

FIG. 2 shows that $$h=R_o \sin \phi_o=R_1 \sin \phi_1 \quad (50)$$

Equation (50) can be rearranged to show that $$R_o=h/\sin \phi_o \quad \text{and} \quad (51)$$

$$R_1=h/\sin \phi_1 \quad (52)$$

Further, the lateral distance between AA' and CC' is the same regardless of whether that distance is expressed in terms of vertical components of $P_o$ or $P_1$, or h plus f. This fact can be expressed as follows:

$$h+f=P_o \sin \phi_o=P_1 \sin \phi_1 \quad (53)$$

Equation (53) can be rearranged to show that $$P_o=(h+f)/\sin \phi_o \quad \text{and} \quad (54)$$

$$P_1=(h+f)/\sin \phi_1 \quad (55)$$

FIG. 2 also shows that $$m_o=P_o \cos \phi_o \quad (56)$$

$$n_o=R_o \cos \phi_o \quad (57)$$

$$m_1=P_1 \cos \phi_1 \quad (58)$$

and $$n_1=R_1 \cos \phi_1 \quad (59)$$

Substituting the right hand sides of equations (54), (51), (55) and (52) for $P_o$, $R_o$, $P_1$ and $R_1$ respectively, in equations (56), (57), (58) and (59) yields $$m_0 = \frac{h+f}{\sin\phi_0}\cos\phi_0 = (h+f)\cot\phi_0 \quad (60)$$

$$n_0 = \frac{h}{\sin\phi_0}\cos\phi_0 = h\cot\phi_0 \quad (61)$$

$$m_1 = \frac{h+f}{\sin\phi_1}\cos\phi_1 = (h+f)\cot\phi_1 \quad (62)$$

$$n_1 = \frac{h}{\sin\phi_1}\cos\phi_1 = h\cot\phi_1 \quad (63)$$

Substituting the right hand sides of equations (60) and (61) for $m_o$ and $n_o$ respectively in equation (48) produces $$(h+f) \cot \phi_o+h \cot \phi_o=d+F_o \cos \theta_o \quad (64)$$

This equation can be simplified through the following steps $$h \cot \phi_o f \cot \phi_o+h \cot \phi_o=d+F_o \cos \theta_o \quad (65)$$

$$2h \cot \phi_o+f \cot \phi_o=d+F_o \cos \theta_o \quad (66)$$

$$2h \cot \phi_o=d+F_o \cos \theta_o-f \cot \phi_o \quad (67)$$

Substituting the right hand side of equation (46) for f in equation (67) shows that $$2h \cot \phi_o=d+F_o \cos \theta_o-F_o \sin \theta_o \cot \phi_o \quad (68)$$

Equation (68) can be rearranged as follows to isolate h $$h = \frac{d}{2\cot\phi_0} + \frac{F_0\cos\theta_0}{2\cot\phi_0} - \frac{F_0\sin\theta_0}{2} \quad (69)$$

Now, substituting the right hand sides of equations (62) and (63) for $m_1$ and $n_1$ respectively in equation (49) produces $$(h+f)\cot\phi_1 + h\cot\phi_1 = d + F_1\cos\theta_1 \quad (70)$$

This equation can be simplified through the following steps $$h\cot\phi_1 + f\cot\phi_1 + h\cot\phi_1 = d + F_1\cos\theta_1 \quad (71)$$

$$2h\cot\phi_1 + f\cot\phi_1 = d + F_1\cos\theta_1 \quad (72)$$

$$2h\cot\phi_1 = d + F_1\cos\theta_1 - f\cot\phi_1 \quad (73)$$

FIG. 2 shows that $$f = F_1\sin\theta_1 \quad (74)$$

and substituting the right hand side of equation (74) for f in equation (73) shows that $$2h\cot\phi_1 = d + F_1\cos\theta_1 - F_1\sin\theta_1\cot\phi_1 \quad (75)$$

Equation (75) can be rearranged as follows to isolate h $$h = \frac{d}{2\cot\phi_1} + \frac{F_1\cos\theta_1}{2\cot\phi_1} - \frac{F_1\sin\theta_1}{2} \quad (76)$$

To express d independent of h, the left and right hand sides of equation (76) can be subtracted respectively from the left and right hand sides of equation (69), yielding $$h - h = \frac{d}{2\cot\phi_o} + \frac{F_o\cos\theta_o}{2\cot\phi_o} - \frac{F_o\sin\theta_o}{2} - \left(\frac{d}{2\cot\phi_1} + \frac{F_1\cos\theta_1}{2\cot\phi_1} - \frac{F_1\sin\theta_1}{2}\right) \quad (77)$$

This can be simplified and rearranged through the following steps $$0 = \frac{d}{2\cot\phi_0} + \frac{F_0\cos\theta_0}{2\cot\phi_0} - \frac{F_0\sin\theta_0}{2} - \frac{d}{2\cot\phi_1} - \frac{F_1\cos\theta_1}{2\cot\phi_1} + \frac{F_1\sin\theta_1}{2} \quad (78)$$

$$\frac{d}{\cot\phi_1} - \frac{d}{\cot\phi_0} = \frac{F_0\cos\theta_0}{\cot\phi_0} - \frac{F_1\cos\theta_1}{\cot\phi_1} + F_1\sin\theta_1 Z - F_0\sin\theta_0 \quad (79)$$

Equations (46) and (74) show that $$F_1\sin\theta_1 = F_o\sin\theta_o \quad (80)$$

so that these terms cancel each other out in equation (79) and that equation simplifies to $$d(\tan\phi_1 - \tan\phi_o) = F_o\cos\theta_o\tan\phi_o - F_1\cos\theta_1\cot\phi_1 \quad (81)$$

which can be rearranged as follows $$d = \frac{F_o\cos\theta_o\tan\phi_o - F_1\cos\theta_1\cot\phi_1}{\tan\phi_1 - \tan\phi_o} \quad (82)$$

To express h independent of d, the left and right hand sides of equation (75) are subtracted respectively from the left and right hand sides of equation (68) yielding $$2h\cot\phi_o - 2h\cot\phi_1 = (d + F_o\cos\theta_o - F_o\sin\theta_o\cot\phi_o) - (d + F_1\cos\theta_1 - F_1\sin\theta_1\cot\phi_1) \quad (83)$$

This simplifies to $$2h(\cot\phi_o - \cot\phi_1) = F_o\cos\theta_o - F_o\sin\theta_o\cot\phi_o - F_1\cos\theta_1 + F_1\sin\theta_1\cot\phi_1 \quad (84)$$

which can be rearranged as follows:

$$h = \frac{F_o\cos\theta_o - F_o\sin\theta_o\cot\phi_o - F_1\cos\theta_1 + F_1\sin\theta_1\cot\phi_1}{2(\cot\phi_o - \cot\phi_1)} \quad (85)$$

Thus, initial given values for the maximum and minimum source beam wavelengths $\lambda_o$ and $\lambda_1$, maximum and minimum focal lengths $F_o$ and $F_1$, minimum and maximum signal beam deflection angles $\theta_o$ and $\theta_1$, and minimum and maximum reference beam angles $\phi_o$ and $\phi_1$, determine the initial parameters h, d, f and g that establish the initial placement of recording medium 132 in system 200. For any subsequent source beam wavelength $\lambda_i$, the distance x can be determined and medium 132 moved accordingly to generate the condition for fabricating a matched filter at that different wavelength. With system 200, as with system 100, regardless of the wavelength used to construct matched filter 132, the filter always has the same system constant, S, given by the equation $$S = 1/\lambda_F \quad (86)$$

While both systems 100 and 200 may be effectively employed to practice this invention, system 100 is preferred because, as a practical matter, a greater number of wavelengths can be used with system 100.

A value that is particularly useful when discussing system 100 is the ratio $$\mu = \lambda_o/\lambda_1 \quad (87)$$

Equations (4) and (5) show that this value is equal to several other ratios. Specifically $$\mu = \sin\theta_o/\sin\theta_1 = F_1/F_o \quad (88)$$

Since element 136 is a diffraction grating, equation (44) applies to the diffraction angle $\phi$ of reference beam 122 in system 100 so that $$\sin\phi_o = (m\lambda_o)/b \quad (89)$$

and $$\sin\phi_1 = (m\lambda_1)/b \text{ TM} \quad (90)$$

Equations (89) and (90) can be rearranged as follows $$\lambda_o = (b\sin\phi_o)/m \quad (91)$$

$$\lambda_1=(b \sin \phi_1)/m \quad (92)$$

Substituting the right hand sides of equations (91) and (92) for $\lambda_o$ and $\lambda_1$ respectively in equation (87) shows that $$\mu = \frac{b\sin\phi_o/m}{b\sin\phi_1/m} = \frac{\sin\phi_o}{\sin\phi_1} \quad (93)$$

Figure 3:
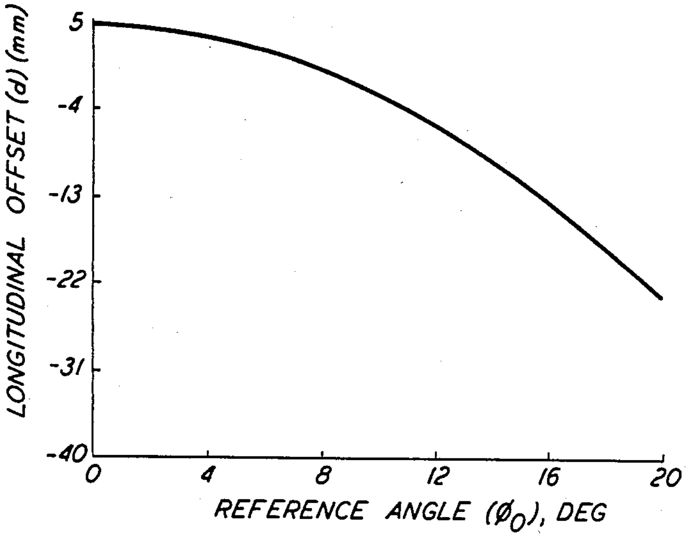
FIG. 3 shows two graphs illustrating the relationship between various optional parameters of the optical memory fabrication system of FIG. 1.
Figure 3:
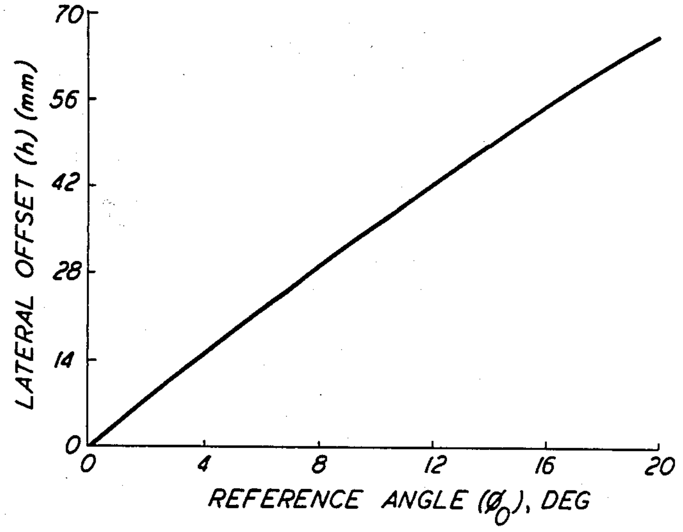

FIG. 3 shows the range of possible values for d and h for system 100 as a function of $\theta_o$ for the given values $F_o=207.4$ mm, $\theta_o=7.7°$, and $\mu=1.2958$ When d has a negative value, dispersion element 136 is located to the right of dispersion element 126. FIG. 3 illustrates the inverse relationship between h and d; that is, for given values of $F_o$, $\theta_o$ and $\mu$, as h is decreased, d increases, and vice versa. There appears to be no particularly optimum values for h and d; although as a practical matter, the sizes of the elements of system 100 place lower limits on the spacing between those elements.

Figure 4:
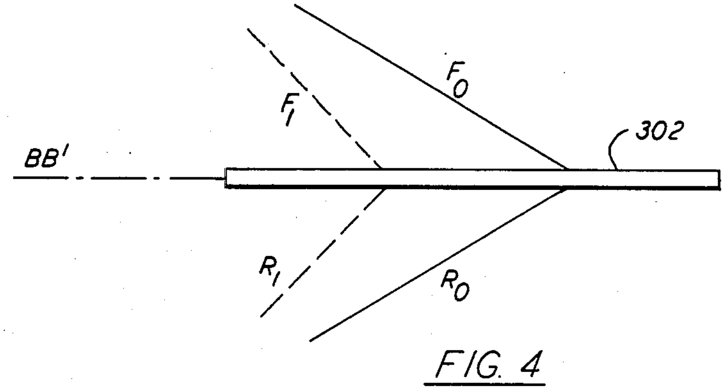
FIG. 4 shows a transmissive matched filter that may be used in the systems of FIGS. 1 and 2.
Figure 5:
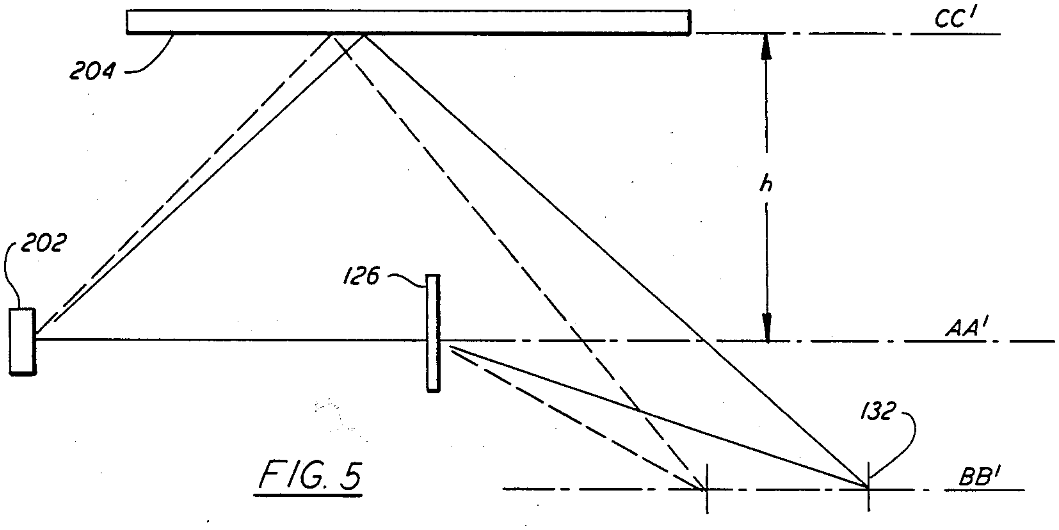
FIG. 5 illustrates an optional placement of one of the elements of the system shown in FIG. 2.
Figure 6:
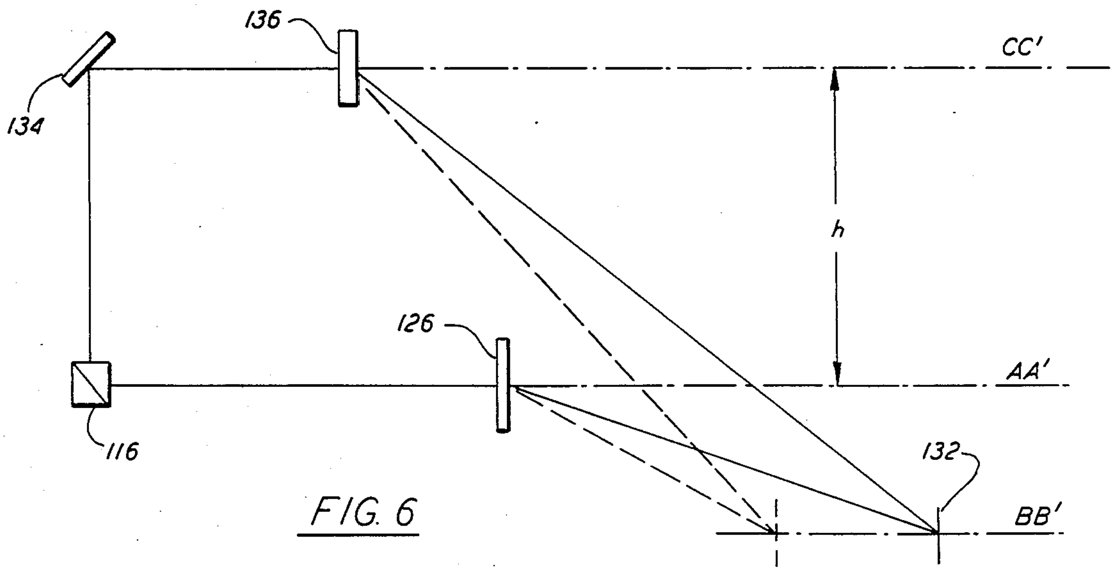
FIG. 6 illustrates an optional placement of several elements of the system shown in FIG. 1.

As will be understood by those skilled in the art, systems 100 and 200 may be employed in a variety of ways and with a variety of particular elements without departing from the scope of the present invention. For instance, systems 100 and 200 can be used to manufacture two or more different matched filters at different wavelengths, as well as a single matched filter at multiple wavelengths. Moreover, systems 100 and 200 may construct a reflective matched filter, as well as the transmissive filter shown in FIGS. 1 and 2. With reference to FIG. 4, if a reflective matched filter 302 is constructed in either system 100 or 200, the face of the filter is aligned with axis BB′ and is moved along that axis in accordance with equations (22) or (45). Also, the reference beam deflection element, either diffraction grating 136 of system 100 or mirror 204 of system 200, may be located above or below the AA′ axis. With reference to FIGS. 5 and 6, if third dispersion element 134 or 204 is positioned above the AA′ axis—that is, on the opposite side of axis AA′ from recording medium 132—the parameter h determined by equations (42) or (85) is the lateral distance between the AA′ axis and the reference axis CC′.

Figure 7:
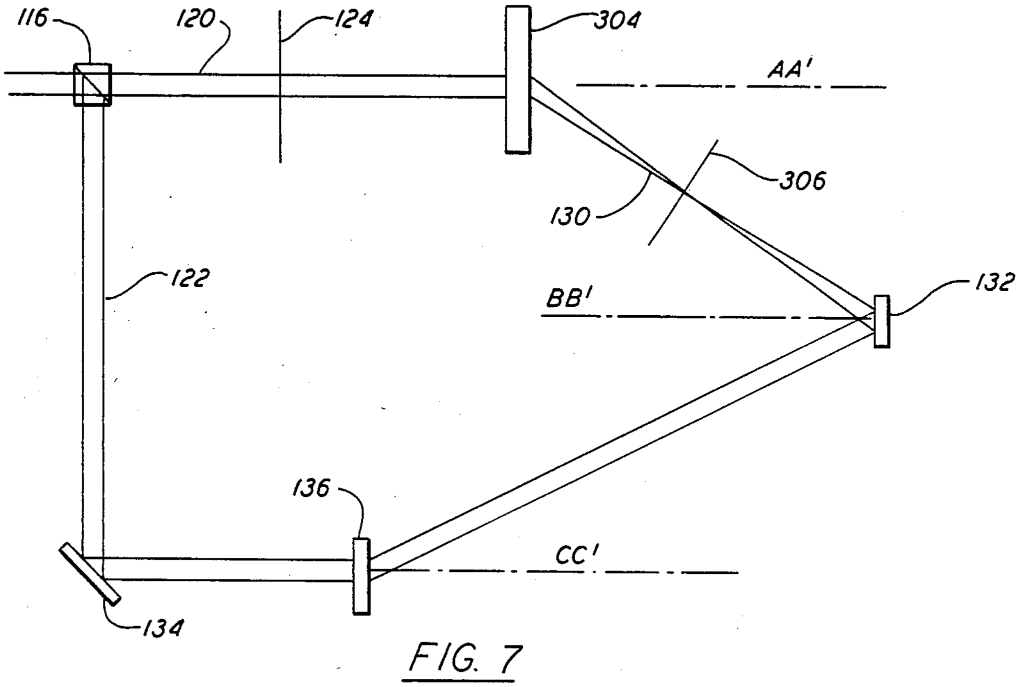
FIG. 7 shows a modified version of the system of FIG. 1 using a multiple holographic lens and an apertured stop to record a multiple optical memory device.
Figure 8:
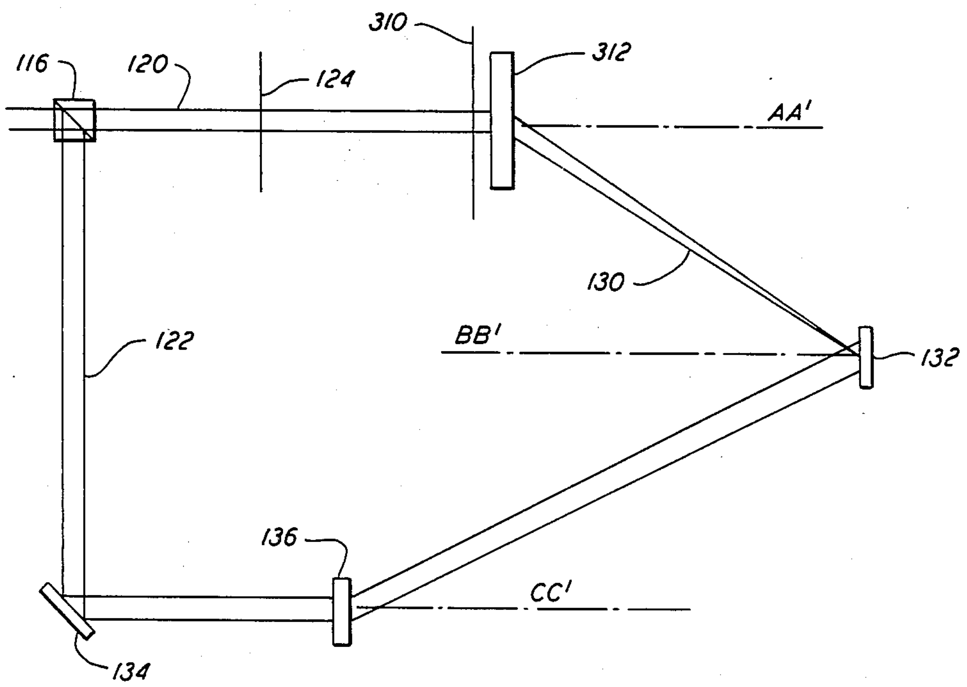
FIG. 8 shows a second modified version of the system of FIG. 1 that also may be used to fabricate a multiple image optical memory device.

With reference to FIG. 7, the signal beam dispersion element of systems 100 or 200 may be a multiple holographic lens 304, and an apertured stop 306 may be positioned in the path of beam 130 between that holographic lens and medium 132 and controlled to permit a succession of exposures from the multiple holographic lens to be recorded on the medium 132. The result at matched filter 132 is an array of non-coherently added holographic lenses. Alternately, as taught in FIG. 8, a contact screen 310 and a conventional Fourier transform lens 312 may be used as the signal dispersion element of systems 100 or 200 to fabricate a multiple image matched filter in a coherently added fashion.

Figure 9:
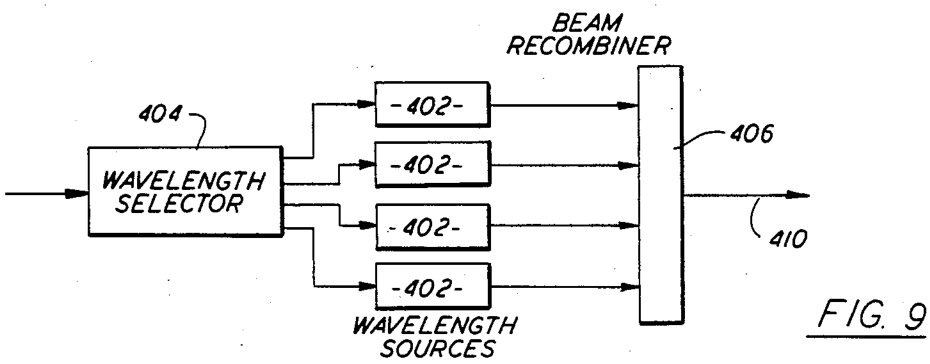
FIG. 9 is a block diagram of an alternate arrangement for producing source beams at different wavelengths that may be used in the systems of FIGS. 1 and 2.
Figure 10:
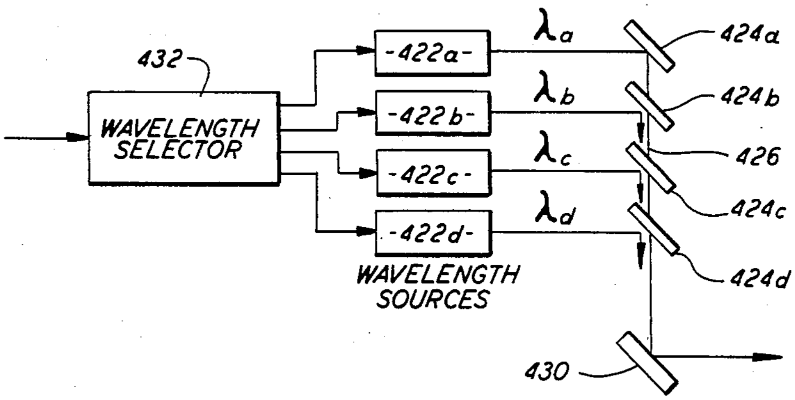
FIG. 10 illustrates a third arrangement for producing beams at different wavelengths.
Figure 11:
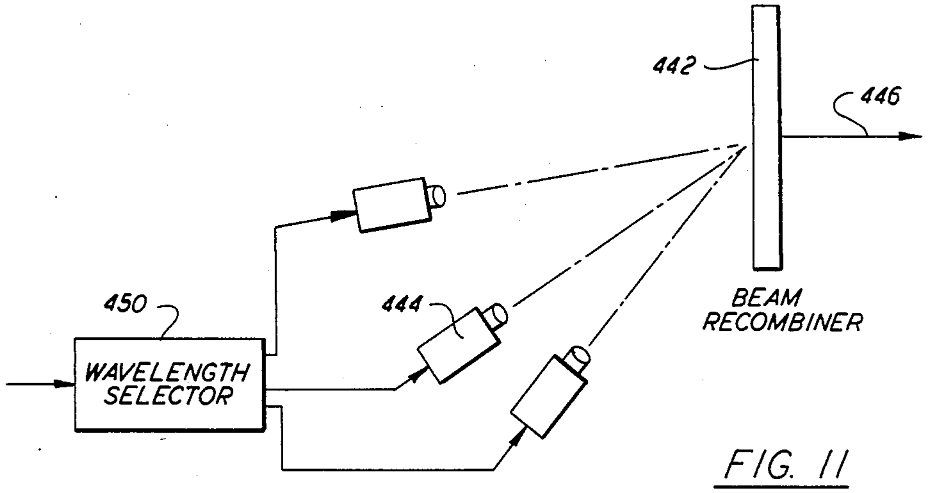
FIG. 11 shows yet another way to produce source beams at various wavelengths which may be used in the practice of this invention.

FIGS. 9, 10 and 11 illustrate three additional ways which can be employed in the practice of this invention to produce source beams 114 of different wavelengths. Unlike the embodiments of FIGS. 1 and 2, in the arrangements shown in FIGS. 9–11 the variations in wavelength of the input radiation incident on dispersion element 116 or 202 is not effected by a parametric converter, but by changes in wavelength of the radiation itself. Changes in the wavelength of the radiation source can be achieved in a number of ways, for example, such as by utilizing a plurality of lasers, each having a discrete wavelength, or by employing a plurality of organic dye cells, each of which will emit at its characteristic wavelength when excited by a laser, and the like.

When a dye laser is utilized as the wavelength source, a high-intensity source of radiation such as an argon ion or krypton ion laser optically "pumps" an organic dye solution. The dye solution fluoresces at some wavelength longer than the pump wavelength. With a laser "pump" of sufficient power, an inversion and optical gain is produced over a broad range of wavelengths. An optical resonator including a tuning element is used to extract coherent radiation at any wavelength where sufficient gain exists. Lasing from less than 4200 angstroms to more than 9500 angstroms can be achieved by optimizing the various laser parameters, dyes and optics.

Either a single laser and a dye to cover a limited range such as 1000 angstroms, or a plurality of laser-dye combinations having a total wavelength coverage as high as 4000 angstroms can be employed. Should a plurality of laser-dye cell combinations be utilized, beam recombining means such as those to be described in greater detail hereinafter would be employed to condition the input into the first dispersion element of system 100 or system 200.

Apparatus embodying a plurality of lasers 402 each having discrete output wavelengths is shown in FIG. 9. A wavelength selector 404 selectively activates the lasers in a controlled manner. Radiant energy from each of lasers 402 is collected by means of a suitable optical recombiner 406 and the single output beam 410 therefrom is directed to the first dispersion element of system 100 or 200. With reference to FIG. 1, the signal beam 120 from first dispersion element is directed to second dispersion element of the system, and the on-axis zero order output beam from the second dispersion element is directed through fourth dispersion element 142. The output therefrom will fall upon photosensor array 146 as has been discussed in detail previously. When a plurality of lasers 402 as shown in FIG. 9 are used to provide the source beam for system 100 or 200, one photodetector 150 of the photosensor array 146 of the system 100 or 200 is associated with each laser to position recording medium 132 according to which laser is activated.

Another embodiment of the invention utilizing a plurality of discrete wavelength sources and beam recombining means is illustrated in FIG. 10. The various wavelength sources such as lasers 422 are aligned sequentially in a single plane. Each laser 422 is directed at a different mirror 424 lying in the same plane, and these mirrors in turn are positioned such that the radiation reflected therefrom is directed along an axis 426 passing through the center of the mirrors. More specifically, the end laser **422*a* has its output beam of a discrete wavelength $\lambda_a$ directed at a dichroic mirror 424*a* and the output therefrom is directed along the axis 426 which passes through a plurality of dichroic mirrors 424*b*, *c* and *d* and is then reflected off a plane mirror 430. The second laser 422*b* has an output beam of discrete wavelength $\lambda_b$ which is directed at dichroic mirror 424*b* and the reflected beam therefrom is also directed along axis 426 to plane mirror 430**. Each of the other lasers in the arrangement has its output reflected off its associated dichroic mirror and the combined outputs therefrom are reflected by mirror 430 to the first dispersion element of system 100 or 200 for utilization therein.

In this embodiment, the dichroic mirrors 424 are used to combine the discrete wavelength outputs of the plurality of lasers 422. It is a characteristic of a dichroic mirror that it transmits all wavelengths of radiation except radiation incident thereon at a selected angle and a selected wavelength which it reflects. Thus, $\lambda_a$ and $\lambda_b$ can combine at mirror 424*b* because that mirror transmits $\lambda_a$ but reflects $\lambda_b$ at the angle $\lambda_b$ is incident on the mirror. In operation, a wavelength selector 432 will activate the specific laser whose output has the desired wavelength. This wavelength will be reflected by the associated dichroic mirror, but will be transmitted by the other dichroic mirrors in its path and will be redirected by plane mirror 430 such that it passes through the first dispersion element of system 100 or 200 and is utilized as described previously in accordance with the teachings of the invention.

A further embodiment of this invention utilizing a plurality of discrete wavelength sources and beam recombining means is illustrated in FIG. 11. In this embodiment, holograph lens 442 is used as the beam recombining means. The apparatus comprises various wavelength sources such as lasers 444 having their output beams directed at the holographic beam recombiner 442 which, in turn, passes its output beam 446 through the first dispersion element of system 100 or 200 for use in accordance with the teachings of the invention. The selection of the proper source to generate the radiation source beam for fabricating matched filter 132 of system 100 or 200 is effected by a wavelength selector 450.

Holographic beam recombiner 442 is substantially a holographic lens used in a reverse mode. By positioning each given wavelength source 444 at a particular angle and distance from holographic recombiner 442, each source 444, when activated, will give an identically oriented beam which is directed to the first dispersion element of system 100 or 200 for utilization therein.

Figure 12:
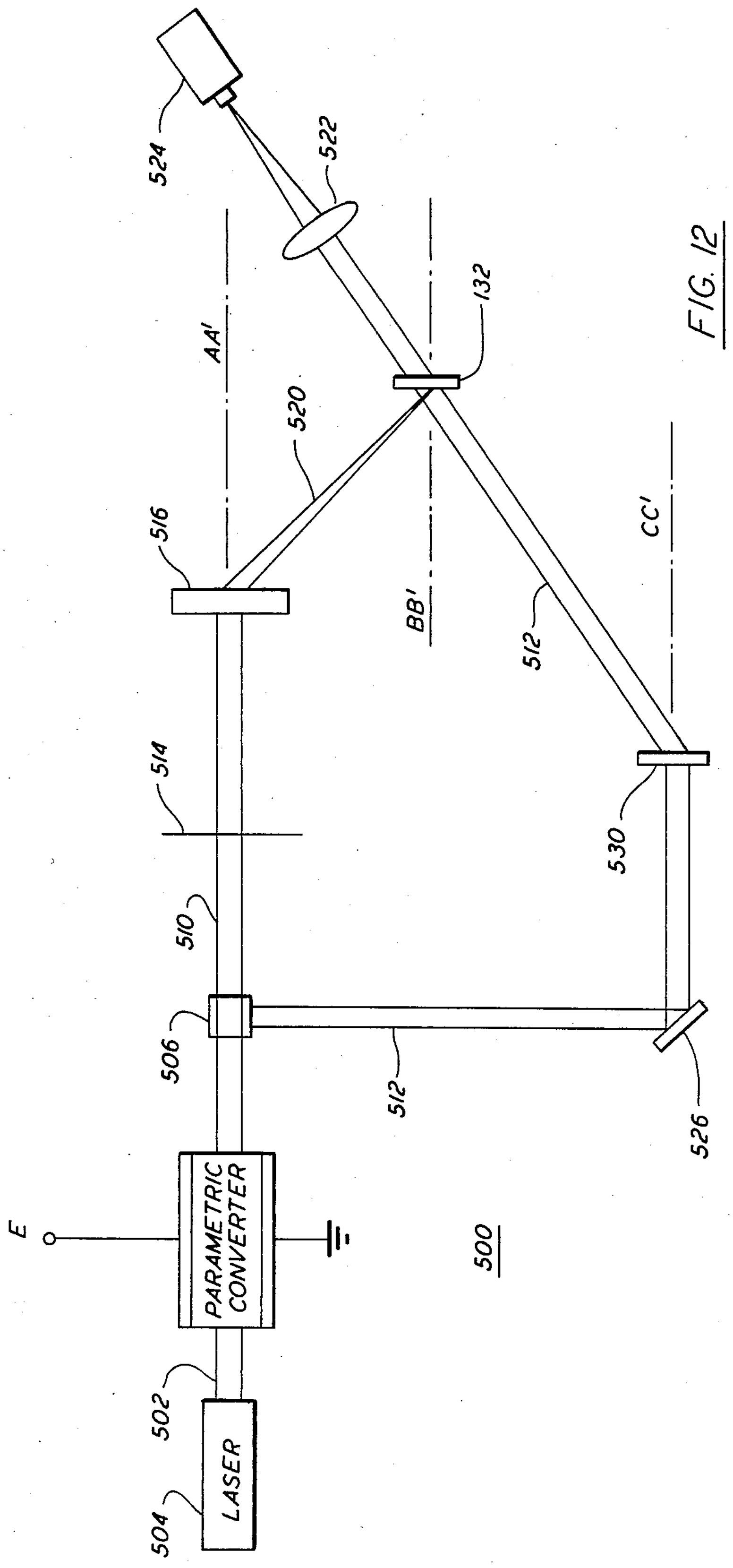
FIG. 12 is a block diagram showing an optical correlator system using a matched filter fabricated in accordance with teachings of the present invention.

FIG. 12 shows an optical correlation system 500 for using recording medium 132 on which a matched filter has been fabricated in accordance with this invention. A coherent collimated light beam 502 from a monochromatic laser 504 is directed at beam splitter 506 which splits the beam into beams 510 and 512. Beam 510 passes through image 514, which may be a photographic film, and then to holographic lens 516. In passing through image 514, the laser beam becomes amplitude modulated with the imagery on the image. Beam expansion of the output of laser 504 may be required to ensure that the complete area of image 514 is illuminated by beam 510, and beam reducing optics may be required between image 514 and hologram 516 to compress beam 510 to the area of the hologram. Neither of these optical devices is shown in FIG. 12, but their use is well understood, and if needed can be readily inserted in system 500.

Output beam 520 of hologram 516 is directed against matched filter 132. When image 514 and matched filter 132 are spaced from holographic lens 516 by the focal distance of the hologram, the hologram performs a Fourier transform of all the imagery on image 514 and the modulated light beam 520 reaches the matched filter as axially centered, superimposed spectra of all objects in the input scene on image 514. As will be understood by those skilled in the art, holographic lens 516 could be replaced with a combination of a conventional Fourier transform lens and a specifically designed contact screen. The output of the matched filter 132 is transmitted through spherical lens 522 to the plane of to optical detector 524, which may be the front screen of a television camera tube, as shown, or an array of solid state optical detectors, or any other suitable detector.

The diffraction pattern of a view of a selected target is stored in matched filter 132, and if the pattern formed by input beam 520 matches the pattern stored on the matched filter, the output beam of the matched filter is a relatively coherent light beam of a relatively high intensity, and lens 522 is able to focus that output beam onto a particular location on the plane of optical detector 524, forming a bright spot at that location. If the diffraction pattern formed by beam 520 does not match the pattern stored on matched filter 132, the output beam of the matched filter is relatively diffuse and weak, resulting in a weak, diffuse light on the plane of optical detector 524. Optical detector 524 is light sensitive, and the detector produces a signal such as an electric current when a light point of sufficient intensity is focused on the plane of the detector. This signal is used to trigger some type of device, depending upon the apparatus is which the target recognition system is used. Such a device might be a simple alarm or a complex guidance system, for example.

In accordance with this invention, a recording medium on which a matched filter has been made may be used in system 500 at different wavelengths of source beam 502 provided the initial displacements between the AA′ and BB′ axis and between the BB′ and CC′ axis are given in accordance with equations (23) and (42) respectively, the longitudinal displacements between elements 524 and 516 and between elements 516 and 132 are given in accordance with equations (39) and (24) respectively, and matched filter 132 is translated along axis BB′, parallel to the axis AA′ of the source beam 502, in accordance with equation (22).

A comparison of FIG. 1 with FIG. 12 shows that system 100 may be easily modified to form system 500. In particular, lens 522 and detector 524 may be provided in system 100, making it unnecessary to add the lens 522 and the optical detector 524 to system 100 to convert that system to system 500. If this is the case, system 100 may be converted to system 500 simply by substituting image 514, having views of scenes which may have a suspected target, for image 124, which is a view of the suspected target itself. Thus, by following the teachings of this invention, an optical system may be designed and constructed both to record and to use, or playback, matched filters at various wavelengths.

Beam splitter 506, mirror 526 and diffraction grating 530, which correspond to elements 116, 134 and 136 of system 100, are not necessary to the operation of optical correlator system 500. Elements 506, 526 and 530 are helpful, though, for aligning lens 522 and detector 530 since the output beam of matched filter 132 is along the axis of the beam 512 as diffracted by grating 530. Also, as system 100 is converted to system 500, it is easier to keep beam splitter 506, mirror 526 and grating 530 than to remove those elements and subsequently replace them when system 500 is converted back to a matched filter fabrication system 100.

As will be appreciated, system 200 may also be easily modified to form an optical correlator system. This may be done, first, by adding to system 200 a lens and an optical detector analogous to lens 522 and optical detector 524 of system 500, and second, by substituting an image of scenes which may have a suspected target for image 124. In practice, an optical detector and a focusing lens therefor may be permanent fixtures of system 200, permanently located on the output side of element 132 in system 200.

Figure 13:
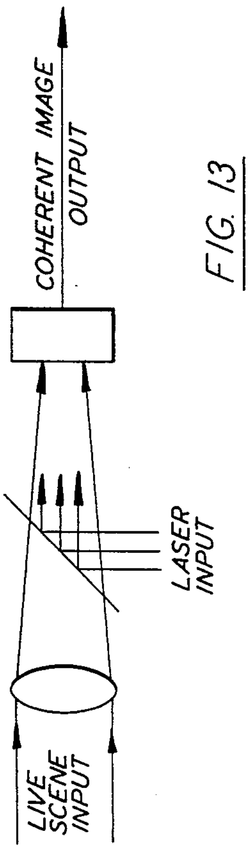
FIG. 13 illustrates a live scene transducer that may be used in the system shown in FIG. 12.

In the description of the preferred embodiments just completed, a photographic film has been used to observe a scene or image 514. Optical correlator system 500 may be employed as well for live target recognition in real time or for active guidance of aircraft along a prescribed track to a specific destination. For such purposes, image 514 is supplanted by a live scene transducer schematically shown in FIG. 13. Live scene transducers allow an incoherent image to amplitude modulate a laser beam, resulting in a coherent image through modulation of a transmission medium, or a reflecting surface, for example. The modulator may contain photochromic material, or variable refractive index crystals when viewing the scene directly through a lens system, or may employ scanning sensor techniques when viewing the scene indirectly through a video system.

The specific transducer or method used to accomplish transformation is not pertinent to the present invention. The important consideration is that the input to the multiple beam generating hologram 516 be an amplitude modulated, coherent, collimated monochromatic image of the incoherent, polychromatic, uncollimated light energy reflected from or emitted by the observed area. Suitable transducers are commercially available and have been thoroughly described in the literature, so that a further description is not needed here.

Figure 14:
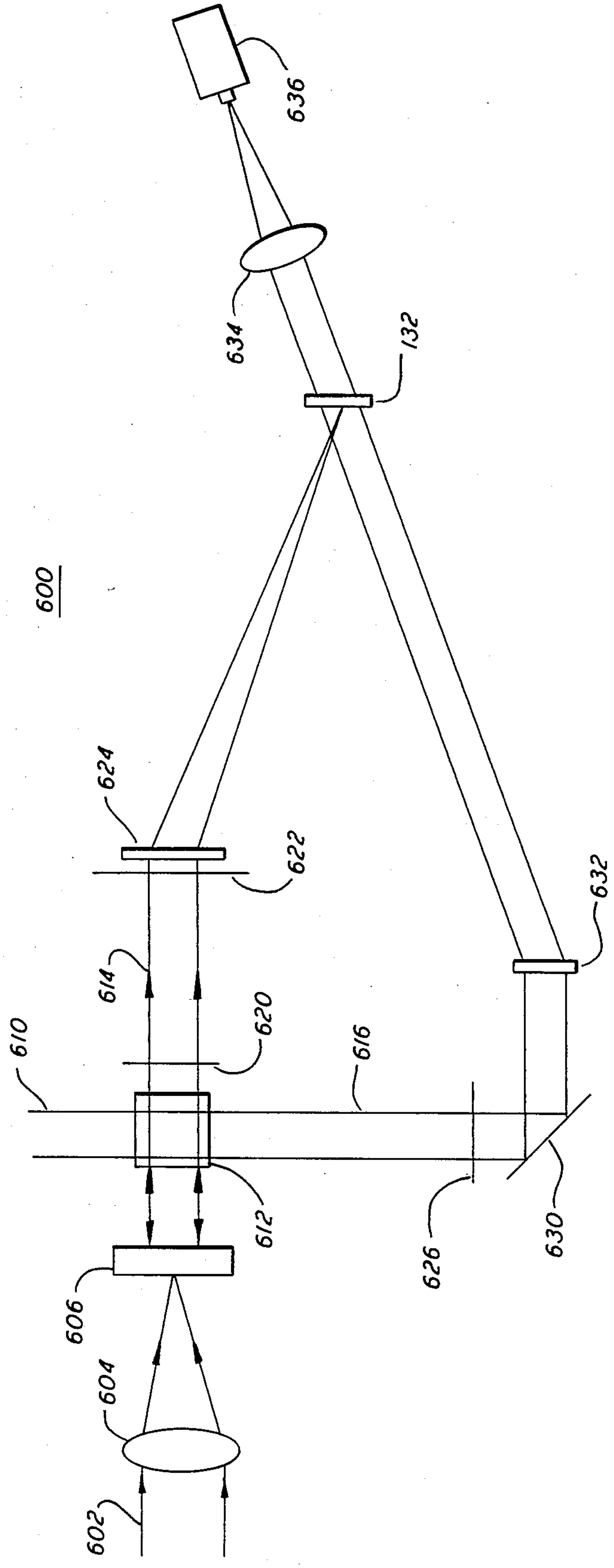
FIG. 14 is a block diagram of a second optical correlator system using a matched filter fabricated pursuant to this invention.

FIG. 14 illustrates an alternate optical correlator system 600 for using recording medium 132 on which a matched filter has been made. Input image 602, which may be the output from a television monitor, is directed through lens 604 onto the input side of liquid crystal light valve 606. At the same time, coherent collimated beam 610 from a monochromatic laser source is directed at beam splitter 612, which splits the beam into signal and reference beams 614 and 616. The signal beam is directed to the output side of light valve 606. Light valve 606 modulates the signal beam as a function of the intensity of input image beam 602, and reflects the signal beam back through beam splitter 612 and through analyzer 620, producing an intensity modulated coherent signal beam 614.

Signal beam 614 thence passes through contact screen 622 and hologram 624, which directs the beam onto matched filter 132. Reference beam 616 is passed through polarization rotator 626 and reflected off mirror 630 to diffraction grating 632, which deflects the reference beam to matched filter 132. Polarization rotator 626 is provided, it should be noted, to ensure that reference beam 616 arrives at matched filter 132 with the same polarization of signal beam 614, which is polarized by analyzer 620. Signal and reference beams 614 and 616 interfere with each other at matched filter 132, and the output therefrom is directed through lens 634 to optical detector 636. The matched filter, lens 634 and detector 636 of system 600 operate in a manner identical to the way the matched filter, lens 526 and optical detector 530 of system 500 operate to produce an alarm signal if a selected target is present in image beam 602.

It should be observed that, while systems 500 and 600 have been described as employing matched filter 132 having a single image fabricated thereon, a matched filter having multiple images stored thereon may also be used in the practice of the present invention. Also, a reflective matched filter may be used in systems 500 and 600. In addition, as with systems 100 and 200, numerous elements of systems 500 and 600, as well as of a correlator system formed from system 200, may be placed in different optional locations. Specifically, with reference to FIGS. 5 and 6, the reference beam dispersion element may be placed on the opposite lateral side of axis AA′ from element 132. Furthermore, a multitude of arrangements, such as those shown in FIGS. 9, 10, and 11, may be used in systems 500 and 600 to generate source beams of different wavelengths.

The target recognition systems disclosed herein are in their broadest senses object recognition devices that can be applied in many different ways. The invention may be embodied in an aerial reconnaissance system, using filmed or live observation, and in a guidance and navigation system. The invention may also be utilized in mail and check sorting, where the targets, or objects to be recognized, would be written or printed characters; in medical diagnosis, where the objects to be recognized would be biological entities in animal tissues and fluids; in product inspection; in criminal identification, where the target to be recognized would be fingerprints; or in robotic control systems, where the target objects might be, for instance, articles in a bin or moving along an assembly line.

While it is apparent that the invention disclosed herein is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. An optical correlator memory processing system comprising:

means for generating an electromagnetic source beam at a multitude of wavelengths;

means located in the path of the source beam for splitting the source beam into a signal beam and a reference beam, and directing the signal beam along a first axis;

image means located in the path of the signal beam to spatially modulate the signal beam;

a recording medium located on a second axis parallel to the first axis;

signal beam deflection means located on the first axis to receive the signal beam from the image means and to deflect a Fourier transform of the source beam to the recording medium;

reference beam deflection means located on a third axis parallel to the first and second axes, in the path of the reference beam, to deflect the reference beam to the recording medium, and to cause interference between the reference beam and the Fourier transform of the signal beam at the recording medium; and means for moving the recording medium along the second axis to cause interference between the reference beam and the Fourer transform of the signal beam at the recording medium at a plurality of source beam wavelengths.

2. A system according to claim 1 wherein the signal beam deflection means deflects a signal beam of wavelength $\lambda_o$ through an angle $\theta_o$ from the first axis and at a focal length $F_o$, and deflects a signal beam of wavelength $\lambda_1$, through an angle $\theta_1$, from the first axis and at a focal length $F_1$, wherein the moving means moves the recording medium along the second axis a distance x given by the equation $$x = F_o\cos\theta_o - F_o\sqrt{\frac{\lambda_o^2}{\lambda_i^2} - \sin^2\theta_o}$$

as the wavelength of the source beam changed from $\lambda_o$ to $\lambda_1$.

3. A system according to claim 2 wherein the means for moving the recording medium includes:

means for sensing the wavelength of the source beam and generating a first signal indicative thereof;

a driver connected to the recording medium; and a controller receiving the first signal from the sensing means and transmitting a second signal to the driver to move the recording medium along the second axis.

4. A system according to claim 1 wherein:

the generating means generates an electromagnetic source beam at a multitude of wavelengths between first and second wavelengths, $\lambda_o$ and $\lambda_1$;

the signal beam deflection means deflects a signal beam of wavelength $\lambda_o$ through an angle $\theta_o$ from the first axis and at a focal length $F_o$, and deflects a signal beam of wavelength $\lambda_1$ through an angle $\theta_1$ from the first axis and at a focal length $F_1$;

the reference beam deflection means deflects a reference beam of wavelength $\lambda_o$ through an angle $\phi_o$ from the third axis, and deflects a reference beam of wavelength $\lambda_1$ through an angle $\phi_1$ from the third axis;

the signal beam deflection means is longitudinally spaced from the means for splitting the source beam a distance d given by the equation $$d = \frac{F_o\cos\theta_o\tan\phi_o - F_1\cos\theta_1\cot\phi_1}{\tan\phi_1 - \tan\phi_o}$$

the lateral distance, f, between the first and second axes is given by the equation $$f = F_o \sin \theta_o$$

the recording medium is longitudinally displaced from the signal beam deflection means a distance g given by the equation $$g = F_o \cos \theta_o \quad \text{and}$$

the lateral distance, h, between the second and third axes is given by the equation $$h = \frac{F_o\cos\theta_o - F_o\sin\theta_o\cot\phi_o - F_1\cos\theta_1 + F_1\sin\theta_1\cot\phi_1}{2(\cot\phi_o - \cot\phi_1)}$$

5. A system according to claim 4 wherein:

the means for splitting the source beam is a diffraction grating;

the signal beam deflection means is a holographic lens; and the reference beam deflection means is a mirror having a planar reflecting surface aligned with the third axis.

6. A system according to claim 4 wherein the recording medium has a matched filter stored therein, and the system further comprises an optical detector located in the path of an output beam of the matched filter to generate a signal when the pattern of the Fourier transform of the source beam at the recording medium matches the matched filter stored therein.

7. A system according to claim 1 wherein:

the generating means generates an electromagnetic source beam at a multitude of wavelengths between first and second wavelengths, $\lambda_o$ and $\lambda_1$;

the signal beam deflection means deflects a signal beam of wavelength $\lambda_o$ through an angle $\theta_o$ from the first axis and at a focal length $F_o$, and deflects a signal beam of wavelength $\lambda_1$ through an angle $\theta_1$ from the first axis and at a focal length $F_1$;

the reference beam deflection means deflects a reference beam of wavelength $\lambda_o$ through an angle $\phi_o$ from the third axis, and deflects a reference beam of wavelength $\lambda_1$ through an angle $\phi_1$ from the third axis;

the recording medium is located on a first lateral side of the first axis;

the reference beam deflection means is located on a second lateral side of the first axis;

the signal beam deflection means is longitudinally spaced from the means for splitting the source beam a distance d given by the equation $$d = \frac{F_o\cos\theta_o\tan\phi_o - F_1\cos\theta_1\cot\phi_1}{\tan\phi_1 - \tan\phi_o}$$

the lateral distance, f, between the first and second axes is given by the equation $$f = F_o \sin \theta_o$$

the recording medium is longitudinally displaced from the signal beam deflection means a distance g given by the equation $$g = F_o \cos \theta_o \quad \text{and}$$

the lateral distance, h, between the first and third axes is given by the equation $$h = \frac{F_o\cos\theta_o - F_o\sin\theta_o\cot\phi_o - F_1\cos\theta_1 + F_1\sin\theta_1\cot\phi_1}{2(\cot\phi_o - \cot\phi_1)}$$

8. A system according to claim 7 wherein the moving means moves the recording medium a distance x given the equation $$x = F_o\cos\theta_o - F_o\sqrt{\frac{\lambda_o^2}{\lambda_i^2} - \sin^2\theta_o}$$

as the wavelength of the source beam changes from $\lambda_o$ to $\lambda_1$.

9. A system according to claim 7 wherein:

the means for splitting the source beam is a diffraction grating;

the signal beam deflection means is a holographic lens; and the reference beam deflection means is a mirror having a planar reflecting surface aligned with the third axis.

10. A system according to claim 7 wherein the recording medium has a matched filter stored therein, and the system further comprises an optical detector located in the path of an output beam of the matched filter to generate a signal when the pattern of the source beam at the recording medium matches the matched filter stored therein.

11. A system according to claim 1 wherein:

the generating means generates an electromagnetic source beam at a multitude of wavelengths between first and second wavelengths, $\lambda_o$ and $\lambda_1$;

the signal beam deflection means deflects a signal beam of wavelength $\lambda_o$ through an angle $\theta_o$ from the first axis and at a focal length $F_o$, and deflects a signal beam of wavelength $\lambda_1$ through an angle $\theta_1$ from the first axis and at a focal length $F_1$;

the reference beam deflection means deflects a reference beam of wavelength $\lambda_o$ through an angle $\phi_o$ from the third axis, and deflects a reference beam of wavelength $\lambda_1$ through an angle $\phi_1$ from the third axis;

the signal beam deflection means is longitudinally displaced from the reference beam deflection means a distance d given by the equation $$d = \frac{F_o\cos\theta_o\tan\phi_o - F_1\cos\theta_1\tan\phi_1}{\tan\phi_1 - \tan\phi_o}$$

the lateral distance, f, between the first and second axes is given by the equation $$f = F_o \sin \theta_o$$

the recording medium is longitudinally displaced from the signal beam deflection means a distance g given by the equation $$g = F_o \cos \theta_o \quad \text{and}$$

the lateral distance, h, between the second and third axes is given by the equation $$h = \frac{F_o\cos\theta_o - F_1\cos\theta_1}{\cot\phi_o - \cot\phi_1}$$

12. A system according to claim 11 wherein the moving means moves the recording medium a distance x given by the equation $$x = F_o\cos\theta_o - F_o\sqrt{\frac{\lambda_o^2}{\lambda_i^2} - \sin^2\theta_o}$$

as the wavelength of the source beam change from $\lambda_o$ to $\lambda_1$.

13. A system according to claim 11 wherein:

the means for splitting the source beam is a beam splitter;

the signal beam deflection means is a holographic lens; and the reference beam deflection means includes a diffraction grating for directing the reference beam to the recording medium, and a mirror for reflecting the reference beam from the beam splitter to the diffraction grating.

14. A system according to claim 11 wherein the recording medium has a matched filter stored therein, and the system further comprises an optical detector located in the path of an output beam of the matched filter to generate a signal when the pattern of the source beam at the recording medium matches the matched filter stored therein.

15. A system according to claim 1 wherein:

the generating means generates an electromagnetic source beam at a multitude of wavelengths between first and second wavelengths, $\lambda_o$ and $\lambda_1$;

the signal beam deflection means deflects a signal beam of wavelength $\lambda_o$ through an angle $\theta_o$ from the first axis and at a focal length $F_o$, and deflects a signal beam of wavelength $\lambda_1$ through an angle $\theta_1$ from the first axis and at a focal length $F_1$;

the reference beam deflection means deflects a reference beam of wavelength $\lambda_o$ through an angle $\phi_o$ from the third axis, and deflects a reference beam of wavelength $\lambda_1$ through an angle $\phi_1$ from the third axis;

the recording medium is located on a first lateral side of the first axis;

the reference beam deflection means is located on a second lateral side of the first axis;

the signal beam deflection means is longitudinally spaced from the means for splitting the source beam a distance d given by the equation $$d = \frac{F_o\cos\theta_o\tan\phi_o - F_1\cos\theta_1\tan\phi_1}{\tan\phi_1 - \tan\phi_o}$$

the lateral distance, f, between the first and second axes is given by the equation $$f = F_o \sin \theta_o$$

the recording medium is longitudinally displaced from the signal beam deflection means a distance g given by the equation $$g = F_o \cos \theta_o$$

and the lateral distance, h, between the first and third axes is given by the equation $$h = \frac{F_o\cos\theta_o - F_1\cos\theta_1}{\cot\phi_o - \cot\phi_1}$$

16. A system according to claim 15 wherein the moving means moves the recording medium a distance x given by the equation $$x = F_o\cos\theta_o - F_o\sqrt{\frac{\lambda_o^2}{\lambda_i^2} - \sin^2\theta_o}$$

as the wavelength of the source beam changes from $\lambda_o$ to $\lambda_i$.

17. A system according to claim 15 wherein:

the means for splitting the source beam is a beam splitter;

the signal beam deflection means is a holographic lens; and the reference beam deflection means includes a diffraction grating for directing the reference beam to the matched filter, and a mirror for reflecting the reference beam from the beam splitter to the diffraction grating.

18. A system according to claim 15 wherein the recording medium has a matched filter stored therein, and the system further comprises an optical detector located in the path of an output beam of the matched filter to generate a signal when the pattern of the source beam at the recording medium matches the optical memory stored therein.

19. An optical correlator memory processing system comprising:

means for generating an electromagnetic source beam at a multitude of wavelengths between first and second wavelengths, $\lambda_o$ and $\lambda_i$;

means located in the path of the source beam for splitting the source beam into a signal beam and a reference beam, and directing the signal beam along a first axis;

image means located in the path of the signal beam to spatially modulate the signal beam;

a recording medium located on a second axis parallel to the first axis;

signal beam deflection means located on the first axis to receive the signal beam from the image means and to deflect a Fourier transform of the source beam to the recording medium, the signal beam deflecting means deflecting a signal beam of wavelength $\lambda_o$ through an angle $\theta_o$ from the first axis and at a focal length $F_o$, and deflecting a signal beam of wavelength $\lambda_1$ through an angle $\theta_1$ from the first axis and at a focal length $F_1$;

reference beam deflection means located on a third axis parallel to the first and second axes, in the path of the reference beam, to deflect the reference beam to the recording medium, the reference beam deflection means deflecting a reference beam of wavelength $\lambda_o$ through an angle $\phi_o$ from the third axis, and deflecting a reference beam of wavelength $\lambda_1$ through an angle $\phi_1$ from the third axis; and means for moving the recording medium along the second axis a distance x given by the equation $$x = F_o\cos\theta_o - F_o\sqrt{\frac{\lambda_o^2}{\lambda_i^2} - \sin^2\theta_o}$$

as the wavelength of the source beam changes from $\zeta_o$ to $\lambda_i$ to maintain interference between the reference beam and the Fourier transform of the signal beam at the recording medium.

20. A system according to claim 19 wherein:

the signal beam deflecting means is longitudinally spaced from the means for splitting the source beam a distance d given by the equation $$d = \frac{F_o\cos\theta_o\tan\phi_o - F_1\cos\theta_1\tan\phi_1}{\tan\phi_1 - \tan\phi_o}$$

the lateral distance, h, between the first and third axes is given by the equation $$h = \frac{F_o\cos\theta_o - F_1\cos\theta_1}{\cot\phi_o - \cot\phi_1}$$

21. A system according to claim 20 wherein:

the means for generating the source beam includes a laser for generating an electromagnetic beam at a preset wavelength and frequency, and a parametric converter for receiving the electromagnetic beam and changing the wavelength and frequency thereof;

the means for splitting the source beam is a beam splitter;

the signal beam deflection means is a holographic lens; and the reference beam deflection means includes a diffraction grating for directing the reference beam to the recording medium, and a mirror for reflecting the reference beam from the beam splitter to the diffraction grating.

22. A method for processing an optical recording medium comprising the steps of:

generating an electromagnetic source beam at a first wavelength between minimum and maximum wavelengths $\lambda_o$ and $\lambda_1$;

splitting the source beam into a signal beam and a reference beam;

directing the signal beam along a first axis;

spatially modulating the signal beam;

producing a Fourier transform of the signal beam at the recording medium;

deflecting the reference beam to interfere with the Fourier transform of the signal beam at the recording medium;

changing the wavelength of the source beam to a second wavelength also between the minimum and maximum wavelengths;

moving the Fourier transform of the signal beam along a second axis, parallel to the first axis; and moving the recording medium along the second axis to maintain interference at the recording medium between the reference beam and the Fourier transform of the signal beam at the second wavelength of the source beam.

23. A method according to claim 22 wherein:

a source beam at a wavelength $\lambda_o$ is deflected to the recording medium at an angle $\theta_o$ from the first axis and at a focal length $F_o$, and a source beam at a wavelength $\lambda_1$ is deflected to the recording medium at an angle $\theta_1$ from the first axis and at a focal length $F_1$;

a reference beam at a wavelength $\lambda_o$ is deflected to the recording medium at an angle $\phi_o$ from a third axis, parallel to the first axis, and a reference beam at a wavelength $\lambda_1$ is deflected to the recording medium at an angle $\phi_1$ from the third axis and at a focal length $F_1$; and the step of moving the recording medium includes the step of moving the recording medium along the second axis a distance x given by the equation $$x = F_o\cos\theta_o - F_o\sqrt{\frac{\lambda_o^2}{\lambda_i^2} - \sin^2\theta_o}$$

as the wavelength of the source beam changes from $\lambda_o$ to $\lambda_i$.

24. A method according to claim 23 wherein:

a driver is connected to the recording medium; and the step of moving the recording medium includes the steps of sensing the wavelength of the source beam, and transmitting a signal to the driver to move the recording medium along the second axis in response to changes in the wavelength of the source beam.

25. A method according to claim 23 wherein:

a first optical element is located on the first axis for splitting the source beam into the signal beam and the reference beam;

a second optical element is located on the first axis for deflecting the Fourier transform of the signal beam to the recording medium;

a third optical element is located on the third axis for deflecting the reference beam to the recording medium;

the second optical element is longitudinally spaced from the first optical element a distance d given by the equation $$d = \frac{F_o\cos\theta_o\tan\phi_o - F_1\cos\theta_1\cot\phi_1}{\tan\phi_1 - \tan\phi_o}$$

the lateral distance, f, between the first and second axes is given by the equation $f = F_o \sin \theta_o$ and when the wavelength of the source beam is $\lambda_o$, (i) the recording medium is longitudinally displaced from the second optical element a distance g given by the equation $g = F_o \cos \theta_o$ and (ii) the lateral distance, h, between the second and third axes is given by the equation.

$$h = \frac{F_o\cos\theta_o - F_o\sin\theta_o\cot\phi_o - F_1\cos\theta_1 + F_1\sin\theta_1\cot\phi_1}{2(\cot\phi_o - \cot\phi_1)}$$

26. A method according to claim 23 wherein:

a first optical element is located on the first axis for splitting the source beam into the signal beam and the reference beam;

a second optical element is located on the first axis for deflecting the Fourier transform of the signal beam to the recording medium;

the recording medium is located on a first lateral side of the first axis;

a third optical element is located on the third axis and a second laterial side of the first axis for deflecting the reference beam to the recording medium;

the second optical element is longitudinally spaced from the first optical element a distance d given by the equation $$d = \frac{F_o\cos\theta_o\tan\phi_o - F_1\cos\theta_1\cot\phi_1}{\tan\phi_1 - \tan\phi_o}$$

the lateral distance, f, between the first and second axes is given by the equation $f = F_o \sin \theta_o$ and when the wavelength of the source beam is $\lambda_o$, (i) the recording medium is longitudinally displaced from the second optical element a distance g given by the equation $g = F_o \cos \theta_o$ and (ii) the lateral distance, h, between the first and third axes is given by the equation $$h = \frac{F_o\cos\theta_o - F_o\sin\theta_o\cot\phi_o - F_1\cos\theta_1 + F_1\sin\theta_1\cot\phi_1}{2(\cot\phi_o - \cot\phi_1)}$$

27. A method according to claim 23 wherein:

a first optical element is located on the first axis for splitting the source beam into the signal base and the reference beam;

a second optical element is locaated on the first axis for deflecting the Fourier transform of the signal beam to the recording medium;

a third optical element is located on the third axis for deflecting the reference beam to the recording medium;

the second optical element is longitudinally displaced from the third optical element a distance d given by the equation $$d = \frac{F_o\cos\theta_o\tan\phi_o - F_1\cos\theta_1\tan\phi_1}{\tan\phi_1 - \tan\phi_o}$$

the lateral distance, f, between the first and second axes is given by the equation $f = F_o \sin \theta_o$ and when the wavelength of the source beam is $\lambda_o$, (i) the recording medium is longitudinally displaced from the second optical element a distance g given by the equation $g = F_o \cos \theta_o$ and (ii) the lateral distance, h, between the second and third axes is given by the equation $$h = \frac{F_o\cos\theta_o - F_1\cos\theta_1}{\cot\phi_o - \cot\phi_1}$$

28. A method according to claim 23 wherein:

a first optical element is located on the first axis for splitting the source beam into the signal beam and the reference beam;

a second optical element is located on the first axis for deflecting the Fourier transform of the signal beam to the recording medium;

the recording medium is located on a first lateral side of the first axis;

a third optical element is located on the third axis and on a second lateral side of the first axis for deflecting the reference beam to the matched filter;

the second optical element is longitudinally spaced from the first optical element a distance d given by the equation $$d = \frac{F_o\cos\theta_o\tan\phi_o - F_1\cos\theta_1\tan\phi_1}{\tan\phi_1 - \tan\phi_o}$$

the lateral distance, f, between the first and second axes is given by the equation $f = F_o \sin \theta_o$ when the wavelength of the source beam is $\lambda_o$, (i) the recording medium is longitudinally displaced from the second optical element a distance g given by the equation $$g = F_o \cos \theta_o \quad \text{and}$$

(ii) the lateral distance, h, between the first and third axes is given by the equation $$h = \frac{F_o\cos\theta_o - F_1\cos\theta_1}{\cot\phi_o - \cot\phi_1}$$

29. An optical correlator system comprising:

means for generating an electromagnetic signal beam at a multitude of wavelengths between first and second wavelengths $\lambda_o$ and $\lambda_1$, and for directing the signal beam along a first axis;

image means located in the path of the signal beam to spatially modulated the beam;

a matched filter located on a second axis parallel to the first axis;

signal beam deflection means located on the first axis to receive the signal beam from the image means and to deflect a Fourier transform of the signal beam to the matched filter; and an optical detector located in the path of an output beam of the matched filter to generate a signal when the pattern of the signal beam at the matched filter matches the pattern of the matched filter;

the signal beam deflection means deflecting the Fourier transform of a signal beam of wavelength $\lambda_o$ through an angle $\theta_o$ from the first axis, and to a focal point at a focal length $F_o$ along the angle $\theta_o$ from the first axis; and the signal beam deflection means deflecting the Fourier transform of a signal beam of wavelength $\lambda_1$ through an angle $\theta_1$ from the first axis, and to a focal points at a focal length $F_1$ along the angle $\theta_1$ from the first axis;

means to move the matched filter along the second axis a distance x given by the equation $$x = F_o\cos\theta_o - F_o\sqrt{\frac{\lambda_o^2}{\lambda_i^2} - \sin^2\theta_o}$$

as the wavelength of the signal beam changes from $\lambda_o$ to $\lambda_1$ to maintain the matched filter at the focal point of the Fourier transform of the signal beam at a plurality of signal beam wavelengths;

the matched filter being at a angle $\theta_o$ from a selected point on a third axis, parallel to the first and second axis, when the wavelength of the signal beam is $\lambda_o$, and at angle $\theta_1$ from the selected point when the wavelength of the signal beam is $\lambda_1$;

the matched filter being laterally spaced from the third axis a distance h given by the equation $$h = \frac{F_o\cos\theta_o - F_1\cos\theta_1}{\cot\phi_o - \cot\phi_1}$$

and the signal beam deflection means being longitudinally spaced from the selected point on the third axis a distance d given by the equation $$d = \frac{F_o\cos\theta_o\tan\phi_o - F_1\cos\theta_1\tan\phi_1}{\tan\phi_1 - \tan\phi_o}$$

30. An optical correlator system comprising:

means for generating an electromagnetic beam at a multitude of wavelengths between first and second wavelengths $\lambda_o$ and $\lambda_1$, and for directing the signal beam along a first axis;

image means located in the path of the signal beam to spatially modulate the beam;

a matched filter located on a second axis parallel to the first axis;

signal beam deflection means located on the first axis to receive the signal beam from the image means and to deflect a Fourier transform of the signal beam to the matched filter; and an optical detector located in the path of an output beam from the matched filter to generate a signal when the pattern of the signal beam at the matched filter matches the pattern of the matched filter;

the signal beam deflection means deflecting the Fourier transform of a signal beam of wavelength $\lambda_o$ through an angle $\theta_o$ from the first axis, and to a focal point at a focal length $F_o$ along the angle $\theta_o$ from the first axis; and the signal beam deflection means deflecting the Fourier transform of a signal beam of wavelength $\lambda_1$ through an angle $\theta_1$ from the first axis, and to a focal point at a focal length $F_1$ along the angle $\theta_1$ from the first axis;

means to move the matched filter along the second axis a distance x given by the equation $$x = F_o\cos\theta_o - F_o\sqrt{\frac{\lambda_o^2}{\lambda_i^2} - \sin^2\theta_o}$$

as the wavelength of the signal beam changes from $\lambda_0$ to $\lambda_1$ to maintain the matched filter at the focal point of the Fourier transform of the signal beam at a plurality of signal beam wavelengths;

the matched filter being at an angle $\phi_o$ from a first point on a third axis, parallel to the first and second axes, when the wavelength of the signal beam is $\lambda_o$, and at an angle $\phi_1$ from a second point on the third axis when the wavelength of the signal beam is $\lambda_1$;

the first point on the third axis being at angle $\phi_o$ from a selected point on the first axis, and the second point on the third axis being at an angle $\phi_1$ from the selected point on the first axis;

the matched filter being laterally displaced from the third axis a distance h given by the equation $$h = \frac{F_o\cos\theta_o - F_o\sin\theta_o\cot\phi_o - F_1\cos\theta_1 + F_1\sin\theta_1\cot\phi_1}{2(\cot\phi_o - \cot\phi_1)}$$

the signal beam deflection means being longitudinally displaced from the selected point on the first axis a distance d given by the equation $$d = \frac{F_o\cos\theta_o\tan\phi_o - F_1\cos\theta_1\tan\phi_1}{\tan\phi_1 - \tan\phi_o}$$

* * * * *

UNITED STATES PATENT AND TRADEMARK OFFICE
CERTIFICATE OF CORRECTION

PATENT NO. : 4,735,486

DATED : April 5, 1988

INVENTOR(S) : Kenneth G. Leib

It is certified that error appears in the above-identified patent and that said Letters Patent is hereby corrected as shown below: On The Title Page:

In the Abstract, line 3: "minium" should read as --minimum--

Column 1, line 52: "$F=(\lambda_c/\lambda Fc$" should read as --$F=(\lambda_c/\lambda)Fc$--

Column 2, line 13: "diffractionn" should read as --diffraction--

Column 5, line 34: "converer" should read as --converter--

Column 12, line 56: "h cot $\phi_o f$cot" should read as --h cot $\phi_o + f$cot--

Column 13, lines 55-57" "$F_1 \sin\theta_1 Z - F \sin\theta_o$" should read as --$F_1 \sin\theta_1 - F \sin\theta_o$ --

Column 14, line 63: delete "TM"

UNITED STATES PATENT AND TRADEMARK OFFICE

CERTIFICATE OF CORRECTION

PATENT NO. : 4,735,486

DATED : April 5, 1988

INVENTOR(S) : Kenneth G. Leib

It is certified that error appears in the above-identified patent and that said Letters Patent is hereby corrected as shown below:

Column 25, line 49: "from $\gamma_0$ to $\lambda_1$" should read as --from $\lambda_0$ to $\lambda_1$ --

Signed and Sealed this

Eighteenth Day of October, 1988

*Attest:*

DONALD J. QUIGG

*Attesting Officer* *Commissioner of Patents and Trademarks*